(12) United States Patent
Sitrick

(10) Patent No.: US 7,827,488 B2
(45) Date of Patent: Nov. 2, 2010

(54) IMAGE TRACKING AND SUBSTITUTION SYSTEM AND METHODOLOGY FOR AUDIO-VISUAL PRESENTATIONS

(76) Inventor: David H. Sitrick, 820 Burchell Ave., Highland Park, IL (US) 60035

( * ) Notice: Subject to any disclaimer, the term of this patent is extended or adjusted under 35 U.S.C. 154(b) by 866 days.

(21) Appl. No.: 11/045,949

(22) Filed: Jan. 28, 2005

(65) Prior Publication Data

US 2005/0151743 A1    Jul. 14, 2005

Related U.S. Application Data

(62) Division of application No. 09/723,169, filed on Nov. 27, 2000, now abandoned.

(51) Int. Cl.
*G06F 13/00* (2006.01)
*G06F 15/00* (2006.01)

(52) U.S. Cl. .................... 715/716; 715/723
(58) Field of Classification Search ......... 715/716–723, 715/726–728, 734, 853, 854, 738, 743, 771; 345/419, 424
See application file for complete search history.

(56) References Cited

U.S. PATENT DOCUMENTS

| | | | |
|---|---|---|---|
| 3,648,245 A | 3/1972 | Dodds, Jr. et al. |
| 3,955,466 A | 5/1976 | Goldmark |
| 4,012,979 A | 3/1977 | Wemekamp |
| 4,149,716 A | 4/1979 | Scudder |
| 4,260,229 A | 4/1981 | Bloomstein |
| 4,261,012 A | 4/1981 | Maloomian |
| 4,286,849 A | 9/1981 | Uchidoi et al. |
| 4,297,724 A | 10/1981 | Masuda et al. |
| 4,305,131 A | 12/1981 | Best |
| 4,333,152 A | 6/1982 | Best |
| 4,350,070 A | 9/1982 | Bahu |
| 4,357,624 A | 11/1982 | Greenberg |
| 4,386,551 A | 6/1983 | Morgando |
| 4,445,187 A | 4/1984 | Best |
| 4,467,349 A | 8/1984 | Maloomian |
| 4,468,204 A | 8/1984 | Scott et al. |
| 4,484,507 A | 11/1984 | Nakada et al. |
| 4,486,774 A | 12/1984 | Maloomian |
| 4,500,879 A | 2/1985 | Smith, III et al. |
| 4,517,658 A | 5/1985 | Iida |
| 4,520,404 A | 5/1985 | Von Kohorn |
| 4,521,014 A | 6/1985 | Sitrick |
| 4,521,021 A | 6/1985 | Dixon |

(Continued)

FOREIGN PATENT DOCUMENTS

DE    3839361    5/1990

(Continued)

OTHER PUBLICATIONS

U.S. Appl. No. 09/415,986, filed Oct. 12, 1999, Sitrick.

(Continued)

*Primary Examiner*—Kevin Nguyen
(74) *Attorney, Agent, or Firm*—Perkins Coie LLP

(57) ABSTRACT

The present invention relates to a system and method for processing a video input signal providing for tracking a selected portion in a predefined audiovisual presentation and integrating selected user images into the selected portion of the predefined audiovisual presentation.

15 Claims, 8 Drawing Sheets

U.S. PATENT DOCUMENTS

| | | |
|---|---|---|
| 4,527,980 A | 7/1985 | Miller |
| 4,539,585 A | 9/1985 | Spackova et al. |
| 4,541,010 A | 9/1985 | Alston |
| 4,542,897 A | 9/1985 | Melton et al. |
| 4,547,851 A | 10/1985 | Kurland |
| 4,553,222 A | 11/1985 | Kurland et al. |
| 4,566,263 A | 1/1986 | Miyazaki et al. |
| 4,569,026 A | 2/1986 | Best |
| 4,572,509 A | 2/1986 | Sitrick |
| 4,591,897 A | 5/1986 | Edelson |
| 4,591,928 A | 5/1986 | Bloom et al. |
| 4,633,416 A | 12/1986 | Walker |
| 4,646,609 A | 3/1987 | Teruo et al. |
| 4,662,635 A | 5/1987 | Enokian |
| 4,682,248 A | 7/1987 | Schwartz |
| 4,684,995 A | 8/1987 | Baumeister |
| 4,688,105 A | 8/1987 | Bloch et al. |
| 4,694,723 A | 9/1987 | Shinohara et al. |
| 4,698,460 A | 10/1987 | Krein et al. |
| 4,698,461 A | 10/1987 | Meadows et al. |
| 4,707,845 A | 11/1987 | Krein et al. |
| 4,710,873 A | 12/1987 | Breslow et al. |
| 4,734,690 A | 3/1988 | Waller |
| 4,745,836 A | 5/1988 | Dannenberg |
| 4,746,994 A | 5/1988 | Ettlinger |
| 4,766,581 A | 8/1988 | Korn et al. |
| 4,779,510 A | 10/1988 | Van den Abbeel |
| 4,807,158 A | 2/1989 | Blanton et al. |
| 4,823,367 A | 4/1989 | Kreutzfeld |
| 4,827,532 A | 5/1989 | Bloomstein |
| 4,843,568 A | 6/1989 | Krueger et al. |
| 4,858,930 A | 8/1989 | Sato |
| 4,872,056 A | 10/1989 | Hicks et al. |
| 4,885,702 A | 12/1989 | Ohba |
| 4,890,833 A | 1/1990 | Lantz et al. |
| 4,893,256 A | 1/1990 | Rutherfoord et al. |
| 4,901,146 A | 2/1990 | Struhs et al. |
| 4,905,168 A | 2/1990 | McCarthy et al. |
| 4,942,551 A | 7/1990 | Klappert et al. |
| 4,976,182 A | 12/1990 | Obuchi et al. |
| 5,001,632 A | 3/1991 | Hall-Tipping |
| 5,002,491 A | 3/1991 | Abrahamson et al. |
| 5,014,234 A | 5/1991 | Edwards, Jr. |
| 5,046,004 A | 9/1991 | Tsumura et al. |
| 5,053,757 A | 10/1991 | Meadows |
| 5,054,360 A | 10/1991 | Lisle et al. |
| 5,083,271 A | 1/1992 | Thacher et al. |
| 5,105,184 A | 4/1992 | Pirani et al. |
| 5,107,443 A | 4/1992 | Smith et al. |
| 5,111,409 A | 5/1992 | Gasper et al. |
| 5,112,051 A | 5/1992 | Darling |
| 5,117,726 A | 6/1992 | Lisle et al. |
| 5,119,474 A | 6/1992 | Beitel et al. |
| 5,126,639 A | 6/1992 | Srivastava |
| 5,136,146 A | 8/1992 | Anglin et al. |
| 5,142,620 A | 8/1992 | Watanabe et al. |
| 5,146,833 A | 9/1992 | Lui |
| 5,148,154 A | 9/1992 | MacKay et al. |
| 5,149,104 A | 9/1992 | Edelstein |
| 5,153,829 A | 10/1992 | Furuya et al. |
| 5,166,463 A | 11/1992 | Weber |
| 5,176,520 A | 1/1993 | Hamilton |
| 5,190,285 A | 3/1993 | Levy et al. |
| 5,194,682 A | 3/1993 | Okamura et al. |
| 5,204,969 A | 4/1993 | Capps et al. |
| 5,218,455 A | 6/1993 | Kristy |
| 5,225,618 A | 7/1993 | Wadhams |
| 5,240,417 A | 8/1993 | Smithson et al. |
| 5,247,126 A | 9/1993 | Okamura et al. |
| 5,250,747 A | 10/1993 | Tsumura |
| 5,264,933 A | 11/1993 | Rosser et al. |
| 5,270,475 A | 12/1993 | Weiss et al. |
| 5,274,758 A | 12/1993 | Beitel et al. |
| 5,278,662 A | 1/1994 | Womach et al. |
| 5,315,911 A | 5/1994 | Ochi |
| 5,341,133 A | 8/1994 | Savoy et al. |
| RE34,728 E | 9/1994 | Hall-Tipping |
| 5,358,259 A | 10/1994 | Best |
| 5,362,069 A | 11/1994 | Hall-Tipping |
| 5,364,271 A | 11/1994 | Aknin et al. |
| 5,367,614 A | 11/1994 | Bisey |
| 5,369,736 A | 11/1994 | Kato et al. |
| 5,384,835 A | 1/1995 | Wheeler et al. |
| 5,393,073 A | 2/1995 | Best |
| 5,400,687 A | 3/1995 | Ishii |
| 5,434,678 A | 7/1995 | Abecassis |
| 5,464,946 A | 11/1995 | Lewis |
| 5,469,740 A | 11/1995 | French et al. |
| 5,477,264 A | 12/1995 | Sarbadhikari et al. |
| 5,488,196 A | 1/1996 | Zimmerman et al. |
| 5,493,677 A | 2/1996 | Balogh et al. |
| 5,496,179 A | 3/1996 | Hoffman |
| 5,511,053 A | 4/1996 | Jae-Chang |
| 5,513,129 A | 4/1996 | Bolas et al. |
| 5,521,323 A | 5/1996 | Paulson et al. |
| 5,521,324 A | 5/1996 | Dannenberg et al. |
| 5,534,917 A | 7/1996 | MacDougall et al. |
| 5,544,354 A | 8/1996 | May et al. |
| 5,553,864 A | 9/1996 | Sitrick |
| 5,590,062 A | 12/1996 | Nagamitsu et al. |
| 5,590,282 A | 12/1996 | Clynes |
| 5,592,609 A | 1/1997 | Suzuki et al. |
| 5,595,389 A | 1/1997 | Parulski et al. |
| 5,604,322 A | 2/1997 | Kikuchi |
| 5,616,876 A | 4/1997 | Cluts |
| 5,617,119 A | 4/1997 | Briggs et al. |
| 5,627,335 A | 5/1997 | Rigopulos et al. |
| 5,636,036 A | 6/1997 | Ashbey |
| 5,643,088 A | 7/1997 | Vaughn et al. |
| 5,656,790 A | 8/1997 | Adachi |
| 5,657,096 A | 8/1997 | Lukacs |
| 5,665,927 A | 9/1997 | Taki et al. |
| 5,666,215 A | 9/1997 | Fredlund et al. |
| 5,680,533 A | 10/1997 | Yamato et al. |
| 5,680,534 A | 10/1997 | Yamato et al. |
| 5,682,326 A * | 10/1997 | Klingler et al. ............. 715/202 |
| 5,689,077 A | 11/1997 | Jasinski |
| 5,689,641 A | 11/1997 | Ludwig et al. |
| 5,696,892 A | 12/1997 | Bedmann et al. |
| 5,728,960 A | 3/1998 | Sitrick |
| 5,728,962 A | 3/1998 | Goede |
| 5,740,549 A | 4/1998 | Reilly et al. |
| 5,760,323 A | 6/1998 | Romero et al. |
| 5,778,372 A | 7/1998 | Cordell et al. |
| 5,823,788 A | 10/1998 | Lemelson et al. |
| 5,830,065 A | 11/1998 | Sitrick |
| 5,850,463 A | 12/1998 | Horii |
| 5,852,251 A | 12/1998 | Su et al. |
| 5,878,403 A | 3/1999 | DeFrancesco et al. |
| 5,903,317 A | 5/1999 | Sharir et al. |
| 5,930,765 A | 7/1999 | Martin |
| 5,935,003 A | 8/1999 | Stephens et al. |
| 5,952,597 A | 9/1999 | Weinstock et al. |
| 5,982,378 A | 11/1999 | Kato |
| 6,017,157 A | 1/2000 | Garfinkle et al. |
| 6,036,601 A | 3/2000 | Heckel |
| 6,061,072 A | 5/2000 | Rouet et al. |
| 6,084,168 A | 7/2000 | Sitrick |
| 6,091,422 A * | 7/2000 | Ouaknine et al. ........... 345/419 |
| 6,110,041 A | 8/2000 | Walker et al. |
| 6,166,744 A | 12/2000 | Jaszlics et al. |
| 6,186,893 B1 | 2/2001 | Walker et al. |
| 6,196,920 B1 | 3/2001 | Spaur et al. |
| 6,208,386 B1 | 3/2001 | Wilf et al. |

| | | |
|---|---|---|
| 6,227,974 B1 | 5/2001 | Eilat et al. |
| 6,234,896 B1 | 5/2001 | Walker et al. |
| 6,285,381 B1 | 9/2001 | Sawano et al. |
| 6,298,481 B1 | 10/2001 | Kosaka et al. |
| 6,307,568 B1 | 10/2001 | Rom |
| 6,348,648 B1 | 2/2002 | Connick, Jr. |
| 6,381,362 B1 | 4/2002 | Deshpande et al. |
| 6,384,871 B1 | 5/2002 | Wilf et al. |
| 6,425,825 B1 | 7/2002 | Sitrick |
| 6,464,585 B1 | 10/2002 | Miyamoto et al. |
| 6,477,314 B1 | 11/2002 | Tai |
| 6,483,019 B1 | 11/2002 | Hamilton |
| 6,500,068 B2 | 12/2002 | Walker et al. |
| 6,504,546 B1 * | 1/2003 | Cosatto et al. .............. 345/473 |
| 6,526,424 B2 | 2/2003 | Kanno et al. |
| 6,536,038 B1 | 3/2003 | Ewertz et al. |
| 6,539,099 B1 * | 3/2003 | Kellner ...................... 382/103 |
| 6,574,625 B1 | 6/2003 | Bates et al. |
| 6,577,311 B1 | 6/2003 | Crosby et al. |
| 6,633,289 B1 | 10/2003 | Lotens et al. |
| 6,692,359 B1 | 2/2004 | Williams et al. |
| 6,721,781 B1 | 4/2004 | Bates et al. |
| 6,740,802 B1 | 5/2004 | Browne, Jr. |
| 6,790,142 B2 | 9/2004 | Okada et al. |
| 6,843,723 B2 | 1/2005 | Joshi |
| 6,882,978 B2 | 4/2005 | Ebisawa |
| 6,901,378 B1 | 5/2005 | Linker et al. |
| 6,902,481 B2 | 6/2005 | Breckner et al. |
| 6,915,243 B1 * | 7/2005 | Inoue et al. .................... 703/2 |
| 6,928,414 B1 | 8/2005 | Kim |
| 6,929,549 B1 | 8/2005 | Yamada |
| 6,952,716 B1 | 10/2005 | Robb et al. |
| 6,954,728 B1 | 10/2005 | Kusumoto et al. |
| 7,019,204 B2 | 3/2006 | Terada |
| 7,040,987 B2 | 5/2006 | Walker et al. |
| 7,074,999 B2 | 7/2006 | Sitrick et al. |
| 7,095,854 B1 | 8/2006 | Ginter et al. |
| 7,098,392 B2 | 8/2006 | Sitrick et al. |
| 7,137,892 B2 | 11/2006 | Sitrick |
| 7,157,638 B1 | 1/2007 | Sitrick |
| 7,231,651 B2 | 6/2007 | Pong |
| 7,230,653 B1 | 9/2007 | Overton et al. |
| 7,297,856 B2 | 11/2007 | Sitrick |
| 7,423,213 B2 | 9/2008 | Sitrick |
| 2001/0022127 A1 | 9/2001 | Chiurazzi et al. |
| 2001/0029829 A1 | 10/2001 | Moe |
| 2001/0037719 A1 | 11/2001 | Gardner et al. |
| 2001/0049297 A1 | 12/2001 | Hibscher et al. |
| 2002/0026865 A1 | 3/2002 | Akahori |
| 2002/0053078 A1 | 5/2002 | Holtz et al. |
| 2002/0142846 A1 | 10/2002 | Paulsen |
| 2002/0144586 A1 | 10/2002 | Connick |
| 2003/0003988 A1 | 1/2003 | Walker et al. |
| 2003/0100965 A1 | 5/2003 | Sitrick et al. |
| 2003/0148811 A1 | 8/2003 | Sitrick |
| 2003/0150317 A1 | 8/2003 | Hamilton |
| 2003/0211881 A1 | 11/2003 | Walker et al. |
| 2004/0040433 A1 | 3/2004 | Errico |
| 2004/0116183 A1 | 6/2004 | Prindle |
| 2004/0242304 A1 | 12/2004 | Walker et al. |
| 2005/0075155 A1 | 4/2005 | Sitrick |
| 2005/0120865 A1 | 6/2005 | Tada |
| 2005/0151743 A1 | 7/2005 | Sitrick |
| 2005/0282638 A1 | 12/2005 | Rowe |
| 2006/0287022 A1 | 12/2006 | Sitrick |
| 2006/0288842 A1 | 12/2006 | Sitrick et al. |
| 2007/0005428 A1 | 1/2007 | Jacobs et al. |
| 2007/0079326 A1 | 4/2007 | Datta et al. |
| 2007/0176006 A1 | 8/2007 | Saunders |
| 2008/0060499 A1 | 3/2008 | Sitrick |
| 2008/0065983 A1 | 3/2008 | Sitrick |
| 2008/0072156 A1 | 3/2008 | Sitrick |
| 2008/0085766 A1 | 4/2008 | Sitrick |
| 2008/0092239 A1 | 4/2008 | Sitrick et al. |
| 2008/0092240 A1 | 4/2008 | Sitrick et al. |
| 2008/0148067 A1 | 6/2008 | Sitrick et al. |

FOREIGN PATENT DOCUMENTS

| | | |
|---|---|---|
| DE | 4200673 | 7/1993 |
| EP | 0092075 | 10/1983 |
| EP | 0253751 | 1/1988 |
| EP | 0337539 | 10/1989 |
| EP | 0402067 | 6/1990 |
| EP | 0405776 | 1/1991 |
| EP | 0737496 | 10/1994 |
| EP | 0661658 | 12/1994 |
| EP | 0640938 | 3/1995 |
| EP | 1033679 | 9/1999 |
| ES | 2077524 | 11/1995 |
| FR | 2670599 | 6/1992 |
| FR | 2762130 | 10/1998 |
| GB | 2106722 | 4/1983 |
| GB | 2163929 | 3/1986 |
| GB | 2194369 | 9/1988 |
| GB | 2279493 | 1/1995 |
| GB | 2287374 | 9/1995 |
| GB | 2293915 | 4/1996 |
| GB | 2349736 | 11/2000 |
| JP | 01099169 | 4/1989 |
| JP | 01113785 | 5/1989 |
| JP | 3139064 | 6/1991 |
| JP | 3275092 | 12/1991 |
| JP | 3284277 | 12/1991 |
| JP | 4329758 | 11/1992 |
| JP | 05073042 | 3/1993 |
| JP | 06004071 | 1/1994 |
| JP | 06274158 | 9/1994 |
| JP | 07020858 | 1/1995 |
| JP | 60253082 | 12/1995 |
| JP | 08115081 | 5/1996 |
| JP | 08123416 | 5/1996 |
| JP | 09034446 | 2/1997 |
| JP | 09097057 | 4/1997 |
| JP | 09114453 | 5/1997 |
| JP | 09244524 | 9/1997 |
| JP | 2000023015 | 1/2000 |
| WO | WO-9304748 | 3/1993 |
| WO | WO-9410680 | 5/1994 |
| WO | WO-9517935 | 9/1995 |
| WO | WO-9743020 | 2/1997 |
| WO | WO-9810358 | 3/1998 |
| WO | WO-9850900 | 11/1998 |
| WO | WO-0004711 | 1/2000 |
| WO | WO-0126762 | 4/2001 |
| WO | WO-0126763 | 4/2001 |
| WO | WO-0156013 | 8/2001 |
| WO | WO-0233656 | 4/2002 |
| WO | WO-0470543 | 8/2004 |

OTHER PUBLICATIONS

U.S. Appl. No. 09/416,233, filed Oct. 12, 1999, Sitrick.
U.S. Appl. No. 09/691,698, filed Oct. 18, 2000, Sitrick.
U.S. Appl. No. 09/723,169, filed Nov. 27, 2000, Sitrick.
"Computer Graphics Visual Effects for Terminator 2: Judgement Day," Siggraph 93: Course Notes 20: Computer Graphics in Visual Effects, 20th International Conference on Computer Graphics and Interactive Techniques; Aug. 1993; sec.3, pp. 1-15; University of California; San Diego, CA, USA.
"Electronic Systems", *NASA Tech Briefs*, vol. 19, No. 12, Dec. 1995, p. 4041.
"EPX-AA2000 PCMCIA Audio", Elger Labs, Inc.
"Film Audio Heads Into the Digital Domain", *Film & Video—The Production Magazine*, p. 2836, Apr. 1991.

"FINALE: The art of Music Notation," 1992, vol. 2 Encycolpedia, 3.0 for Macintosh, 308 pages, Coda Music Software, Eden Prairie, Minnesota.
"Guide-Light System", Yamaha.
"Integrating digital Pens and Finger Touch", Electronic Design, Dec. 16, 1996, pp. 98, 100, 104.
"Mission Accomplished", NASA Tech Briefs, vol. 19, No. 12, Dec. 1995.
"Motion Capture", Next Generation, Oct. 1995, pp. 49-55.
"Music Time®", MIDI Workshop™, Passport Design, Inc.
"Practica Musica™—Version 3", ARS Nova Software.
"Professional MIDI Sequencing & Production: Performer®".
"Professional Quick Time Audio", VideoSystems, Oct. 1995, pp. 64-65.
"Programming 3-D Software", VideoSystems, Oct. 1995.
"Songworks", ARS Nova Software.
"Songworks", Practica Musica—Version 3, ARS Nova.
"Soundstation: Digital Audio Production Systems for Professionals, Product Guide," Digital Audio Research Limited, London, England.
"Summit", Apex, Avmedia, Summit SST, AVM Technology, Inc.
"The Making of Rebel Assault", Multimedia World, Oct. 1995, pp. 62-63, 65, 67.
"The Power of Metadata is Propelling Digital Imaging Beyond the Limitations of Conventional Photography," I3A Resources (Publications, Specifications and Tools), Aug. 1999, pp. 1-7, XP001148750.
"The Story of Waldo C. Graphic," 3-D Character Animation by Computer, Course #4, ACM Siggraph 89, Jul. 1989, pp. 65-79, Boston, MA, USA.
"Use of Dynamic Programming for Automatic Synchronization of Two Similar Speech Signals," by P.J. Bloom, pp. 2.6.1-2.6.4, ©1984 IEEE.
"Wordfit System for Automatic Dialogue Synchronization," 1985, Digital Audio Research, 1985, Rev. 6/85, Digital Audio Research Limited, London, England.
"Wordfit User Manual," 1985, pjb, usmtitle-v1.1, Digital Audio Research Limited, London, England.
Advertisement for ISCAN "Headhunter", NASA Tech Briefs, vol. 19, No. 12, Dec. 1995.
Advertment, "Autoscore", Wildcat Canyon Software.
Beier, Thaddeus et al., "Feature-Based Image Metamorphosis," Computer Graphics Proceedings of the Association for Computing Machinery's Special Interest Group on Computer Graphics, vol. 26, No. 2, pp. 35-42.
Blake, Larry, "Digital Sound for Motion Pictures, Including Production Recording and Random-Access," Recording Engineer Producer, Oct. 1985, pp. 122-136, vol. 16, No. 5.
Bloom, P.J.; Marshall, G.D., "A Digital Processing System for Automatic Dialouge Post-Synchronization," SMPTE Journal, Jun. 1984, pp. 566-569.
Chadwick, John E.; Haumann, David R.; Parent, Richard E,"Layered Construction for Deformable Animated Characters," Computer Graphics, Jul. 1989, pp. 243-252, vol. 23, No. 3, ACM-0-89791-312-4/89/007/0243.
Christopher, Abigail, "Siggraph '85, Part II: The Making of 'Brilliance,' Achieving the Impossible in Special Effects," Computer Graphics World; Jul. 1985; pp. 32-34 and 36; PennWell.
Dasna, Orya et al., "Muse: Digital Music Stand for Symphony Musicians," Interactions Design Awards, May/Jun. 1996, pp. 27-35.
Ditlow et al., "Paging of Display Screen Images Using Footswitch and Digital Interface," ISM Technical Disclosure Bulletin, Jan. 1, 1989, pp. 252-254.
Goldman, Clint, "Abel, Ketchum Create a Sexy robot for Can Council," Back Stage; Jan. 25, 1985; pp. 1, 10.
Graefe, Christopher et al., "Designing the muse: A Digital Music Stand for the Symphony Musician," Apr. 13-18, 1996, pp. 436-441 and 521-524, Design Briefings, ACM/SIGCHI Conference on Human Factors in Computing Systems, Vancouver, British Columbia, Canada.
Graefe, Christopher, Derek Wahila, Justin Maguire and Orya Dasna, "Designing the muse: A Digital Music Stand for the Symphony Musician," 1996 Proceedings of the Association for Computing Machinery (ACM): 436-522.

Hughes, John F., "Scheduled Fourier Volume Morphing," Compuer Graphics Proceedings of The Association for Computing Machinery's Special Interest Group on Computer Graphics, vol. 26, No. 2, pp. 43-46.
Kent, James R., et al., "Shape Transformation for Polyhedral Objects," Computer Graphics Proceedings of The Association for Computing Machinery's Special Interest Group on Computer Graphics, vol. 26, No. 2, pp. 47-54.
Konheim, Alan G., Cryptography, a primer, 1981, 432 pgs., John Wiley Sons, U.S.A.
Mario Paint Instruction Manual, Nintendo, 1992, Relevant Pages Cover, 1, 2, 6, 19-21, and 30-32 (10 pages).
Marshall, G.D.; Bloom, P.J., "VVordfit: a Digital Audio Signal Processing System for Automatic Time Alignment of Post-Synched Dialog," The BKSTS Journal, Apr. 1984, 4 pages; beginning on p. 158, British Kinematograph Sound & Television Society.
Mellor, David, "Digital Audio Recorder," Sound on Sound, Apr. 1990.
Mellor, David, "Wordfit Automatic Dialouge Synchronization," Audio Media, Mar. 1991.
Moods (Music Object Oriented Distributed System), (started 1994, p. 15) (1995 and early 1996, p. 15).
Moods (newly cited reference pp. (26), showing earlier dates than present application).
Music Object Oriented Distributed System (Moods) 1994.
Okabe, Hidehiko, et al., "Three Dimensional Apparel CAD System," Computer Graphics Proceedings of The Association for Computing Machinery's Special Interest Group on Computer Graphics, vol. 26, No. 2, pp. 105-110.
Parent, Rick; King, Scott; Fujimura, Osamu, "Issues with Lip Sync Animation: Can You Read My Lips?" Ohio State University; Univeristy of Otago.
Patent Abstracts of Japan vol. 2000, No. 04, 31 Aug. 2000 & JP 2000 023015 A (Fuji Photo Film Co Ltd), Jan. 21, 2000.
Schneier, Bruce, Applied Cryptography Second Edition: protocols, algorithms, and source code in C, 1996, 758 pga., John Wiley & Sons, U.S.A.
Sederberg et al., "A Physically Based Approach to 2-D Shape Blending," Computer Graphics Proceedings of the Association for Computing Machinery's Special Interest Group on Computer Graphics, vol. 26, No. 2, Jul. 1992, pp. 25-34.
Siggraph 1990: Course Notes 17: Computer Graphics in Visual Effects, 17th International Conference on Computer graphics and Interactive Techniques, Aug. 1990, Univeristy of California, San Diego, CA, USA.
Strutt, Lionel, "Automated Dialog Replacement Using the Computer," The BKSTS Journal, Mar. 1981, pp. 196-198, vol. 63, British Kinematograph Sound & Television Society.
The Digital Imaging Group'S DIG35 Initiative, "The Power of Metadata Is Propelling Digital Imaging Beyond the Limitations of Conventional Photography," I3A Resources (Publications, Specifications and Tools), Aug. 1999, pp. 1-7, XP001148750.
Translation of JP 3-275092 by Ralph McElroy Translation Co., 15 pages.
Tremaine, Howard M., "Audio Cyclopedia," 1973, pp. 864-871, Second Edition, IBSN: 0- 672-20675-7, Howard W. Sams & Co., Inc., Indianapolis, IN, USA.
*Ultimatte Overview*, Ultimatte Corporation, Chatsworth, California, Copyright 1990-1996, pp. 1-20.
United States Court of Appeals for the Federal Circuit, Appeal from the United States District Court for the Central District of California in case No. 03-CV-4265, Judge Stephen V. Wilson, Decided: Feb. 1, 2008, Revised: Feb. 5, 2008, pp. 1-15, USA.
United States District Court Central District of California, Notice of Appeal, Aug. 14, 2006, pp. 1-3, USA.
United States District Court Central District of California, Order Granting Defendants' Motion for Summary Judgment, Jul. 20, 2006 pp. 1-77, USA.
United States District Court Central District of California, Special Master's Report Re Defendants' Motion for Summary Judgment of Invalidity under 35 U.S.C. Section 112 paragraph 1, Aug. 17, 2005, pp. 1-9, USA.

United States District Court Central District of California, Special Master's Report Re Defendants' Motion for Summary Judgment of Unenforceability, Invalidity of U.S. Patent No. 5,553,864 and 6,425,825 and Invervening Rights in Light of Sitrick's Improper Payment of Small Entity Fees and False Declarations to the PTO, Aug. 17, 2005, pp. 1-13, USA.

United States District Court Central District of California, Special Master's Report Re Defendant's Motion For The Court To Construe The Patent Claims, Aug. 17, 2005, pp. 1-32, USA.

United States District Court Central District of California, Special Master's Report Re Motion By Defendants For Summary Judgment of Noninfringement and/or Invalidity Under 35 U.S.C. Section 102, Aug. 17, 2005, pp. 1-8, USA.

United States District Court Central District of California, Special Master's Report Re Motion by Defendants' Motion for Summary Judgment of Invalidity Due To Indefiniteness of Asserted Claims in U.S. Patent No. 6,425,825 (35 U.S.C. 112, paragraph 2), Aug. 17, 2005, pp. 1-9, USA.

United States District Court Central District of California, Special Master's Report Re the Party's Motions To Strike Declarations And Reports, Aug. 17, 2005, pp. 1-9, USA.

Vaz, Mark Cotta et al., *Industrial Light & Magic: Into the Digital Realm*, Ballantine Books, New York 1996, pp. 219-272.

Williams, Lance, "Performance-Driven Facial Animation," Computer Graphics, Aug. 1990, pp. 235-242, vol. 24, No. 4, ACM-0-89791-344-2/90/008/0235.

* cited by examiner

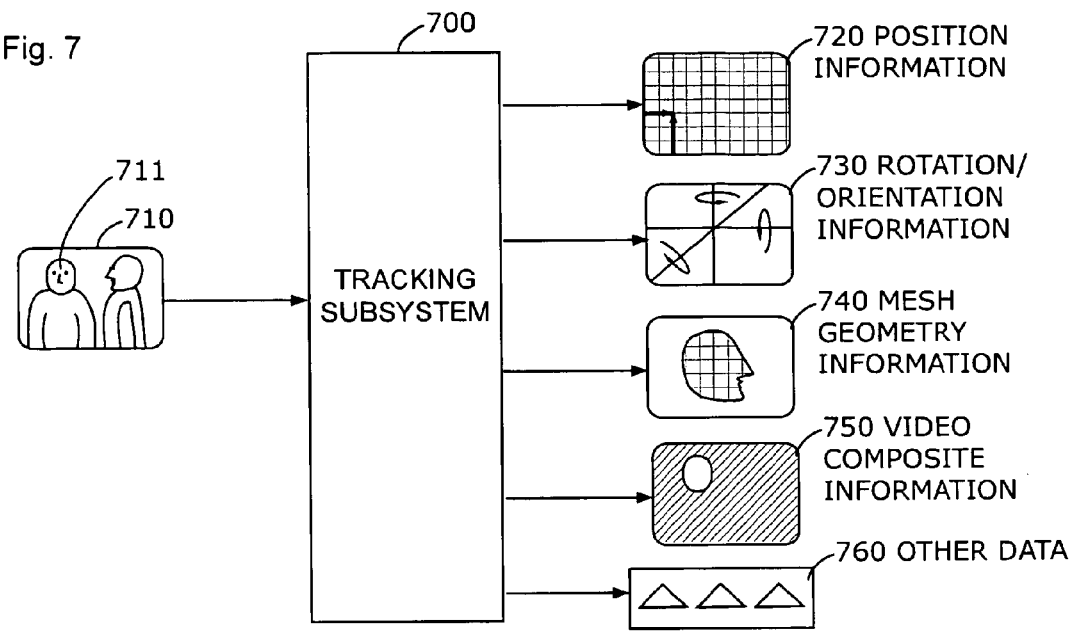
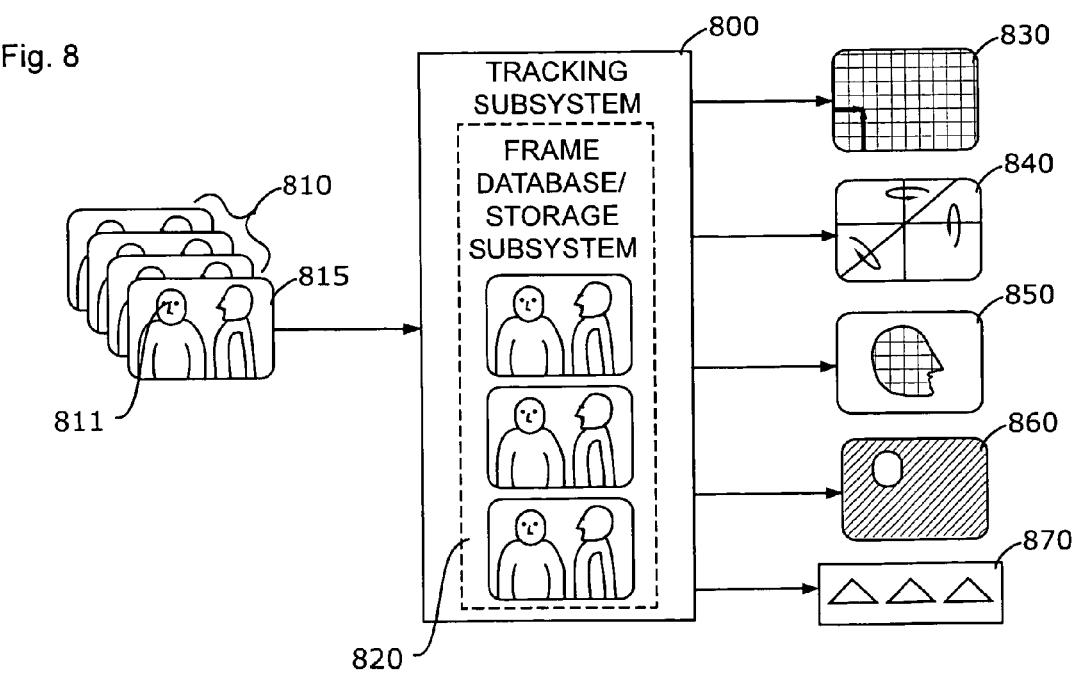

REGION OF INTEREST TRACKING SUBSYSTEM

DATABASE OF PREVIOUSLY IDENTIFIED POSES/EXPRESSIONS

ATTRIBUTE/FEATURE RECOGNITION AND IDENTIFICATION

FRAME DIFFERENCING & MOTION DETECTION SUBSYSTEM

IMAGE TRACKING AND SUBSTITUTION SYSTEM AND METHODOLOGY FOR AUDIO-VISUAL PRESENTATIONS

RELATED APPLICATIONS

This application is a divisional application of U.S. patent application Ser. No. 09/723,169, filed Nov. 27, 2000 now abandoned.

FEDERALLY SPONSORED RESEARCH OR DEVELOPMENT

Not Applicable.

BACKGROUND OF THE INVENTION

This invention relates to predefined video and audiovisual presentations such as movies and video games, and more particularly to a system and process for image tracking and smooth integration substitution of user-created images into a predefined video or audiovisual presentation, including, but not limited to, character image tracking system and methodology for smooth integration of user created video graphics into a predefined video, movie, or game system, etc. The system which provides for the utilization of a user selected visual image as a pre-selected character segment, such that the user selected visual image is incorporated into the audiovisual presentation of the movie or video game in place of a tracked image within the predefined presentation.

Subsequent to the invention of U.S. Pat. No. 4,521,014, video games have been created which utilized predefined digitized images in the video game which supplement the otherwise cartoon-like character and imagery of the game. Additionally, digital and analog video data have been merged with video games and movies to get broadcast quality video for certain aspects of the video display.

It is therefore an object of the present invention to provide a system which tracks an image within the predefined presentation and then utilizes an image generated by an external source (of video and/or audio and/or computer generated), and integrates the image into and as part of a pre-existing audiovisual work (such as from a video game system or a movie or animation) in place of the tracked image which utilizes the user's image in the video game play or movie or as a synthetic participating user image in the predefined audiovisual presentation.

It is an additional object to provide a system and methodology for orderly tracking of a selected portion of the predefined presentation and integration of the user selected or created visual image, or images, into the predefined audiovisual presentation.

It is a further object of the present invention to provide various means for selecting, tracking, and substituting portions of the predefined audiovisual presentation with the user's selected visual image.

User image integration into a predefined audiovisual presentation has had limited usage, such as in video games. For example, some amusement parks provide video entertainment by playing old movie clips incorporating select audience members. A live camera captures the audience member in front of a blue background. The blue color is filtered out of the signal from the audience member camera and the signal is combined with the video signal of the old movie clip. This gives the impression that the audience member is acting in the old movie clip. All of this is typically done in real-time.

A problem with this approach is that a complete set-up is needed (a video camera, a blue-screen, a compositing computer system, etc.) and, the incorporation of the audience member is crude in that the audience member's image overlays the movie clip and is not blended into the movie. Using this approach, there can be no realistic interaction between the audience member and the cast in the movie clip. Plus, there is no continuity in the integration within the presentation and there is no tracking for substitution. There is a resulting need for an entertainment system that facilitates realistically integrating a user's image into a video or audiovisual presentation.

SUMMARY OF THE INVENTION

An audiovisual source provides audio and video signals received by a controller for integration into an audiovisual presentation. The controller analyzes the audio and video signals and modifies the signals to integrate the user image into the audiovisual presentation. This enables the user image to participate in the audiovisual presentation as a synthetic actor.

In accordance with one aspect of the present invention, a user selected image is selectively integrated into a predefined audiovisual presentation in place of a tracked portion of the predefined audiovisual presentation. A user can create a video or other image utilizing any one of a plurality of input device means. The user created image is provided in a format and through a medium by which the user created or selected image can be communicated and integrated into the predefined audiovisual presentation. The tracking and integration means provide for tracking and mapping the user image data into the predefined audiovisual presentation structure such that the user image is integrated into the presentation in place of the tracked image.

The user image can be provided by any one of a number of means, such as by original creation by the user by any means (from audio analysis to a graphics development system, by user assembly of predefined objects or segments, by digitization scan of an external object such as of a person by video camera or a photograph or document (by a scanner, etc.) or supplied by a third party to the user). The user image creation system creates a mappable (absolute or virtual) link of the user defined images for integration into other graphics and game software packages, such as where the user defined or created visual images are utilized in the video presentation of a movie or of the video game as a software function such as one or more of the pre-selected character imagery segment(s) associated with the user's play of the game or as a particular character or other video game software function in the game (e.g., hero, villain, culprit, etc.) and/or a particular portion and/or perspective view of a particular character, such that one or more of the user visual images and/or sounds is incorporated into the audiovisual presentation and play of the resulting video game.

An analysis system analyzes the signals associated with the selected portion of the predefined audiovisual presentation and associates it with the user selected images and selectively tracks the selected portion to substitute therefor the data signals for user selected images, whereby the user selected image is associated with the selected portion so that the user selected image is incorporated into the otherwise predefined audiovisual presentation.

These and other aspects and attributes of the present invention will be discussed with reference to the following drawings and accompanying specification.

BRIEF DESCRIPTION OF THE DRAWINGS

FIG. 7 is a block diagram of a tracking subsystem of a preferred embodiment of the present invention;

FIG. 8 is a block diagram of a tracking subsystem of another preferred embodiment of the present invention;

DETAILED DESCRIPTION OF THE PREFERRED EMBODIMENT

Figure 1:
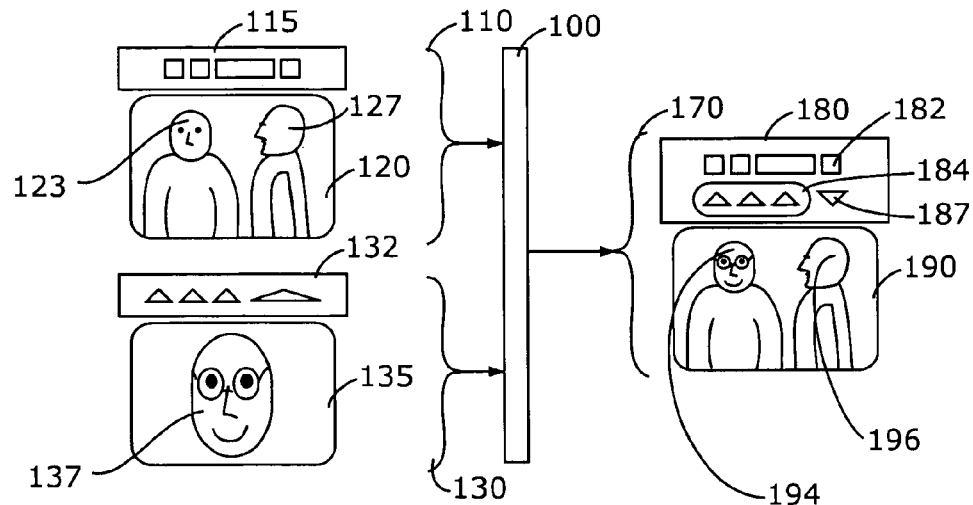
FIG. 1 is a system block diagram of the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 is a system block diagram of the present invention, showing a user image video processing and integration subsystem 100. Coupled to the subsystem 100 is an external source of program content 110 and an external source of user image content 130. The external source of program content 100 is further comprised of other program data 115 and program video 120. In the figure, representations of two people, a first person 123 and a second person 127, are visible in the program video 120. In the external source of user image content 130 is further comprised of other user data 132 and user image data 135, the user image data 135 is further comprised of a user specified image 137. In the figure, 137 appears as a single image of a face. The subsystem 100 processes the sources 110 and 130 producing the output content 170. The output content 170 is comprised of other output data 180 and output video 190. The other output data 180 is further comprised of data from the other program data 115 output as 182, data from the other user data 132 output as 184, and processed data produced by the subsystem 100 output as data 187. The output video 190 consists of a processed version of the program video 120 selectively processed by the subsystem 100 such that the representation 123 has been replaced by the user specified image 137 producing the output 194. The input image 127 is unmodified by the system and output as representation 196 in the output video 190.

Of note is that not all data present in other program data 115 or other user data 132 is necessarily present in output other data 180. Further, data generated by the subsystem 100 or processed by the subsystem 100 may be additionally output within the other output data 180.

Figure 2:
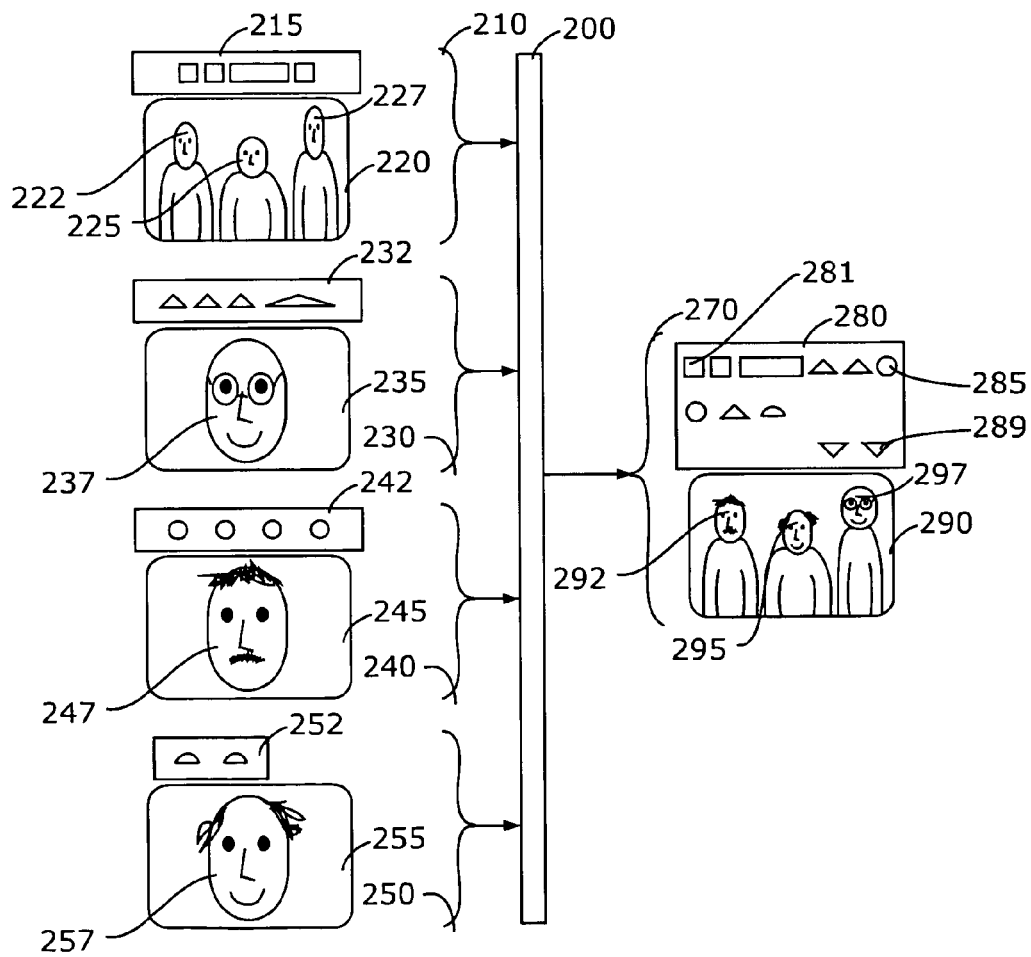
FIG. 2 represents a system block diagram of an alternate embodiment of the present invention.

FIG. 2 represents a system block diagram of an alternate embodiment of this invention. With respect to FIG. 2, there is a user image video processing and integration subsystem 200. Coupled to said subsystem is an external source of program content 210 and a plurality of external sources of user image content 230, 240, and 250. The external source of program content 210 is further comprised of other program data 215 and program video 220. In the figure, the program video 220 contains representations of three persons 222, 225, and 227. The first external source of user image content 230 is comprised of other user data 232 and user image data 235. The user image data 235 is further comprised of user specified image 237, indicated as a representation of a face. External source of user image content 240 is comprised of other user data 242 and user image data 245. The user image data 245 is further again comprised of user specified image 247, representing a different face. In an analogous manner, external source of user image content 250 is further comprised of other user data 252 and user image data 255. The user image data 255 is further comprised of a user specified image 257, representing a still different face.

The subsystem 200 processes the inputs 210, 230, 240, and 250, producing the output content 270. The output content 270 is comprised of other output data 280 and output video 290. The other output data 280 is further comprised of data elements 281, representing data originally supplied to the subsystem by the external source program content 210 as other user data 215. Additionally, output 283 represents other user data 232 supplied to the subsystem via external source of user image content 230. Output 285 represents other user data 242 supplied to the subsystem via external source of user image content 240, and in an analogous manner, output 287 represents other user data 252 supplied to the subsystem via external source of user image content 250. Also output as part of other data 280 are data elements 289; the elements 289 being data generated by or processed by the subsystem 200. The figure shows representations of persons 222, 225 and 227 being selectively processed by the subsystem 200, producing representations 292, 295, and 297, respectively. In the illustrated example, representation 222 has been replaced by the user specified image 247. Representation 227 has been replaced by the user specified image 237. In the illustrated example, representation 225 is not modified by the subsystem and is output as representation 295. In the illustrated example, the user specified image 257 is not used. This figure shows that not all of the external sources of user image content are necessarily used simultaneously or continuously. At specific times in the operation of the subsystem 200, selected ones of the external source of user image contents 230, 240, and 250 may be used to produce the outputs 270.

Figure 3:
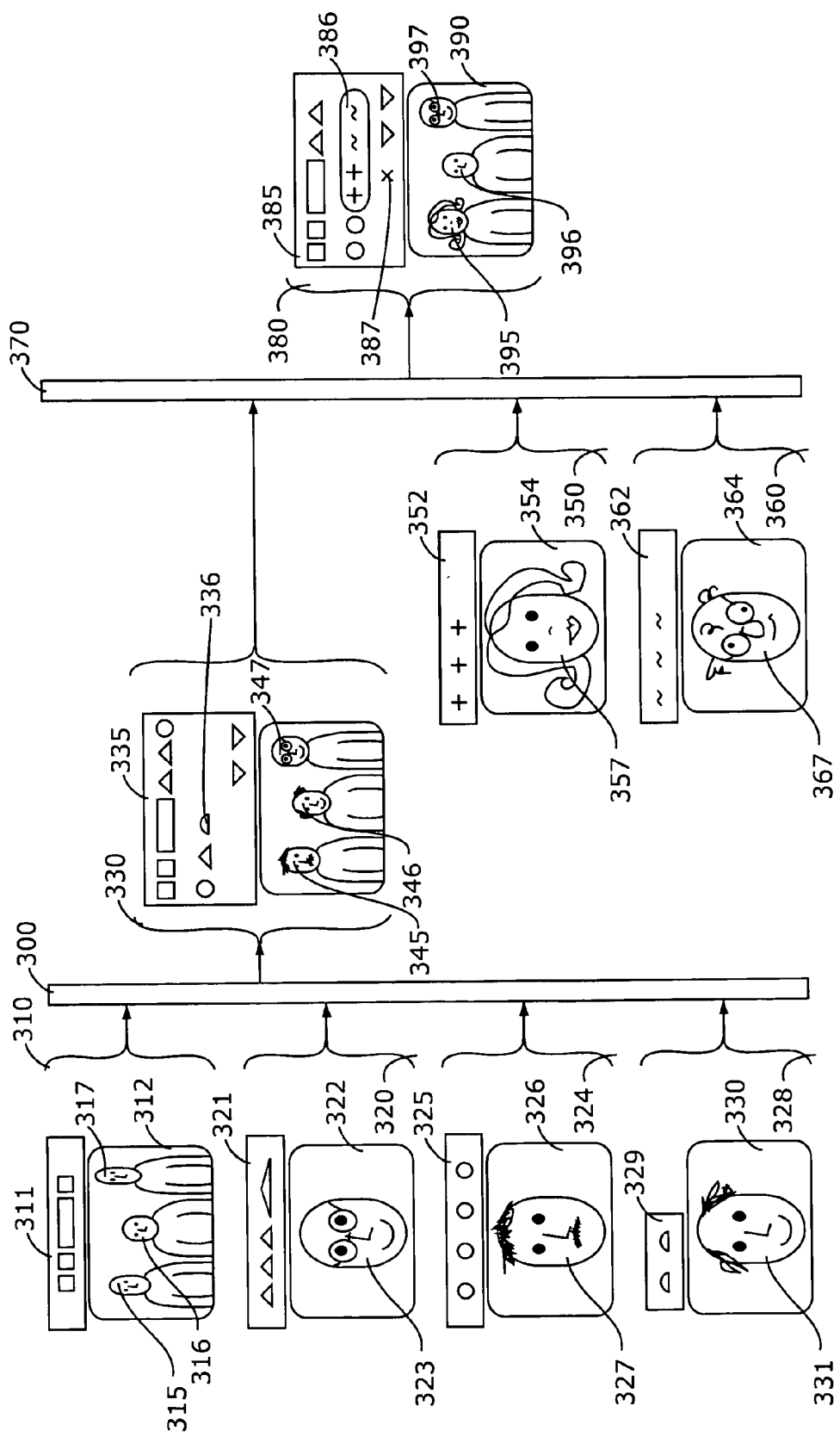
FIG. 3 is a system block diagram of another alternate embodiment of the present invention.

FIG. 3 is a system block diagram of another alternate embodiment of the present invention. FIG. 3 shows a first user image video processing and integration subsystem 300 and a second user image video processing and integration subsystem 370. The first subsystem 300 accepts an external source of program content 310 and a plurality of external sources of user image content 320, 324, and 328. The external source of program content 310 is further comprised of other program data 311 and program video 312. The program video has representations of persons 315, 316, and 317. The external source of user image content 320 is further comprised of other user data 321 and user image data 322. User image data 322 is shown to be comprised of a user specified image 323. In an analogous manner, external sources of user image content 324 and 328 are comprised of other user data 325 and 329 and user image data 326 and 330, each said user image data further comprised of a user specified image 327 and 331, respectively. Inputs 310, 320, 324, and 328 are supplied to the subsystem 300 producing output content 330. Output content 330 is comprised of other output data 335 and output video 340. The output video 340 is further comprised of representations of persons 345, 346, and 347. The output content 330 is coupled to the second subsystem 370 as an external source of program content. Additionally coupled to the second subsystem 370 are a plurality of new external sources of user image content 350, 360 comprised respectively of, and in a manner analogous to previous examples, other user data 352, 362 and user image data 354, 364, comprised of user specified images 357, 367. The output content 330 and the new inputs 350 and 360 are all coupled to the subsystem 370 producing output content 380. The output content 380 is further comprised of other output data 385 and output video 390. The output video 390 is further comprised of representations of persons 395, 396, and 397. As shown in the figure, the processing performed by the first user subsystem 300 selectively replaces representations 315 and 317 with the user supplied images 327 and 323, producing respectively representations 345 and 347. Representation 316 is not modified by the subsystem 300 and is output as representation 346.

The second subsystem 370 then accepts representations 345, 346, and 347 and performs further processing. The further processing in the example illustrated selectively replaces the representation 345 with the user specified image 357, producing an output representation 395. The representation 346 is output unmodified as representation 396, and the representation 347 is output unmodified as representation 397. Elaborating further on the representations of output content of other output data 335 and 385, it should be noted that data element 336, part of other data output 335, can be and in this example is discarded by the second subsystem 370. Additionally, the subsystem 370 produces or synthesizes or processes additional output data 387, as well as coupling selected portions of the other user data 352 and 362, respectively, as the outputs 386. FIG. 3 shows that the output of a first subsystem 330 may be used as an input to a second subsystem 370, wherein any processing performed by first subsystem 300 is subsequently and serially additionally processed by second subsystem 370.

Figure 4:
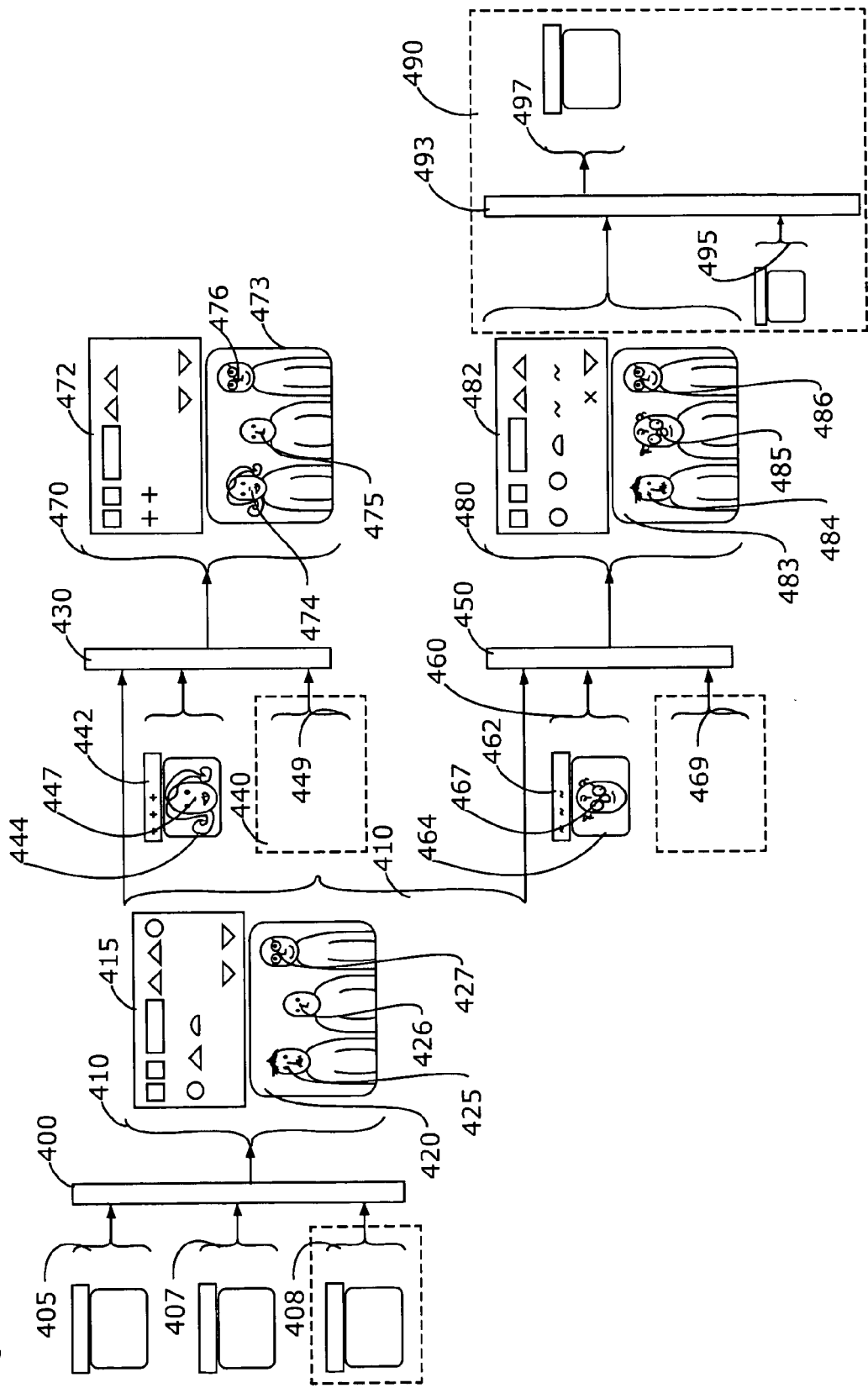
FIG. 4 is a system block diagram of another alternate embodiment of the present invention.

FIG. 4 is a system block diagram of another alternate embodiment of the present invention. In FIG. 4, user image video processing and integration subsystem 400 has coupled to it an external source of program content 405 and a external source of user image content 407, and an optional plurality of additional external sources of user image content 408. The subsystem 400 produces output content 410 comprised of other output data 415 and output video 420, in this example having representations of people 425, 426, and 427. The output content 410 is coupled to second level user image video processing and integration subsystems 430 and 450. Each of the subsystems 430 and 450 have coupled to them respective external sources of user image content 440 and 460, and optional additional plurality of respective external sources of user image content 449 and 469. The subsystems 430 and 450 produce outputs 470 and 480, respectively. As shown in the figure, the output content 470 comprises other output data 472 and output video 473, the output video 473 further comprised of the representations 474, 475, and 476. In an analogous manner, output content 480 is comprised of other output data 482 and output video 483, said output video comprised of representations 484, 485, and 486. It should be noted that, in this example, representation 427 passes unmodified through both subsystems 430 and 450, producing respectively representations 476 and 486. However, representation 486 is only passed unmodified through subsystem 430, producing representation 475. In the illustrated example of the representation 426 being processed by the subsystem 450, the user specified image 467 is used to provide the representation 485 in the output content. Further of note is that representation 425 is processed by the subsystem 430 using the user specified image 447 producing the representation 474.

External source of user image content 440 is further comprised of other user data 442 and user image data 444, said user image data is further comprised of a user specified image 447. In an analogous manner, external source of user image content 460 is further comprised of other user data 462 and user image data 464, said user image data further comprised of user specified image 467.

In general, of note in FIG. 4 is that each level of user image video processing and integration subsystem that operates on program content produces a derivative version of that program content, which can then be further processed by additional and serially subsequent user image video processing and integration subsystems. As illustrated in FIG. 4, this technique can be extrapolated indefinitely by including subsequent processing stages 490, consisting of additional user image video processing and integration subsystems 493, each including additional external sources of user image content 495 and producing output contents 497. Thus, the number of simultaneously created derivative works of the original program content 405 is limited only by the number and arrangement of processing subsystems and the number and assignment of the external sources of user image content to those subsystems.

Figure 5:
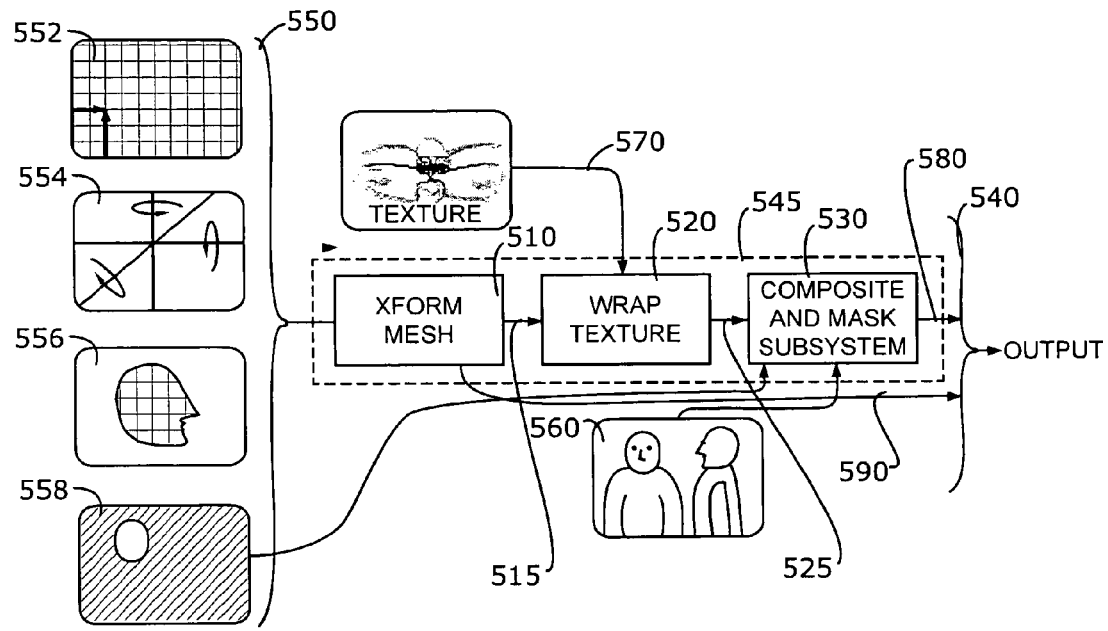
FIG. 5 is a system block diagram of a user image video processing and image integration subsystem of the present invention.

FIG. 5 is a system block diagram of a user image video processing and image integration subsystem. The processing subsystem 500 is comprised of a transform mesh subsystem 510, a wrap texture subsystem 520, and a composite and mask subsystem 530. The transform mesh subsystem is coupled to the wrap texture subsystem via the bus 515, the wrap texture subsystem is coupled to the composite and map subsystem via the bus 525. The output of the user image video processing and integration subsystem 540 is comprised of the output of the composite and mask subsystem 580 and the output of the transform mesh subsystem 590. The inputs to the subsystem 500 are comprised of other program data 550 and program video 560. The other program data 550 is further comprised of various kinds of information, including position information 552, rotation and orientation information 554, mesh geometry information 556, and mask information 558. Other program data 550 is coupled to the transform mesh subsystem 510. Additionally, mask information 558 is coupled to the composite and mask subsystem 530. The program video 560 is also coupled to the composite and mask subsystem 530. An external source of user image content 570 is coupled to the wrap texture subsystem 520. In FIG. 5, the external source of user image content is shown representative of user image data comprising a texture map. The operation of the system shown in FIG. 5 is to use the position, rotation and orientation, and mesh geometry information present in the external program content to transform the mesh geometry information in the subsystem 510, producing a transformed mesh output on buses 515 and 590. The transformed mesh is supplied to the wrap texture subsystem 520, where the texture map 570 is applied to the transformed mesh, producing a rendered image output on bus 525. The rendered image supplied to the composite and mask subsystem is then composited or combined with the program content 560 and masked by the mask data 558, producing a video output 580. The use of the transform mesh subsystem coupled with the wrapping texture subsystem allows the subsystem 500 to recreate the appearance of the user from virtually any orientation or position by mapping the texture map onto the transformed mesh geometry. The compositing and masking operation replaces a selected portion of the program video 560 with the rendered image 525.

The transform mesh operation is a straightforward process documented in numerous texts on computer graphics and easily implemented on a general purpose computer programmed to do the task. The mesh geometry primary consists of coordinates of points which may be used to describe polygons, or triangles, or a wire frame representation, or patches, based on B-splines or NURBS, all of which can be used to describe the 3-dimensional geometry of all or a portion of a user's body or head. Once this geometric description is created, the transformation process is very straightforward—the system takes the coordinates of the points that define those various entities and produces transformed versions that are correctly rotated, positioned, and have perspective or aspect ratio or field of view operations applied to them. The equations and example programs for implementing the transform mesh subsystem's functions on a general purpose computer are published in such places as Foley, Van Damm *Computer Graphics and Applications*, also standard computer graphics texts by Hearn or Watt.

Similarly, once the mesh geometry has been transformed appropriately, the process of taking a texture map and wrapping that texture map around the transformed mesh is a straightforward process that is documented in the same literature. The wrap texture subsystem can also easily be implemented on a general purpose computer programmed to do the task. In addition to just about any standard commodity personal computer available from the usual vendors (Apple, IBM, etc.), there are also special purpose hardware and hardware/software combinations that are sold by vendors to accommodate doing the operations of the transform mesh subsystem and the wrap texture subsystem in a hardware assisted manner to produce a very cost effective and rapid result. These devices fall generically in the category of 3-D accelerators, commonly sold for personal computers by vendors such as Apple, Matrox, Diamond, S3, and a multitude of others.

The operations of the composite and mask subsystem are easily performed by a general purpose computer, insofar as the process necessary to implement the operation is documented in the literature, including Keith Jack's *Video Demystified* sections on luma- and chroma-keying. However, the amount of data that has to be processed generally implies that this step needs to be performed by a hardware-assisted or special purpose circuit. Such circuits are readily available from a variety of vendors, including for example, the Ultimatte compositing and masking subsystem which is available from Ultimatte Corporation.

The creation of the texture map is not a necessary part of this invention. The texture map may be simply supplied to the invention from an external source. Systems to assist the generation of the texture map are available from a number of different vendors that specialize in scanning of three dimensional objects. The scanning process can be anywhere from fractions of a second to tens of seconds with most commercial systems and the resulting texture maps are generally produced once and then used over and over.

Figure 6:
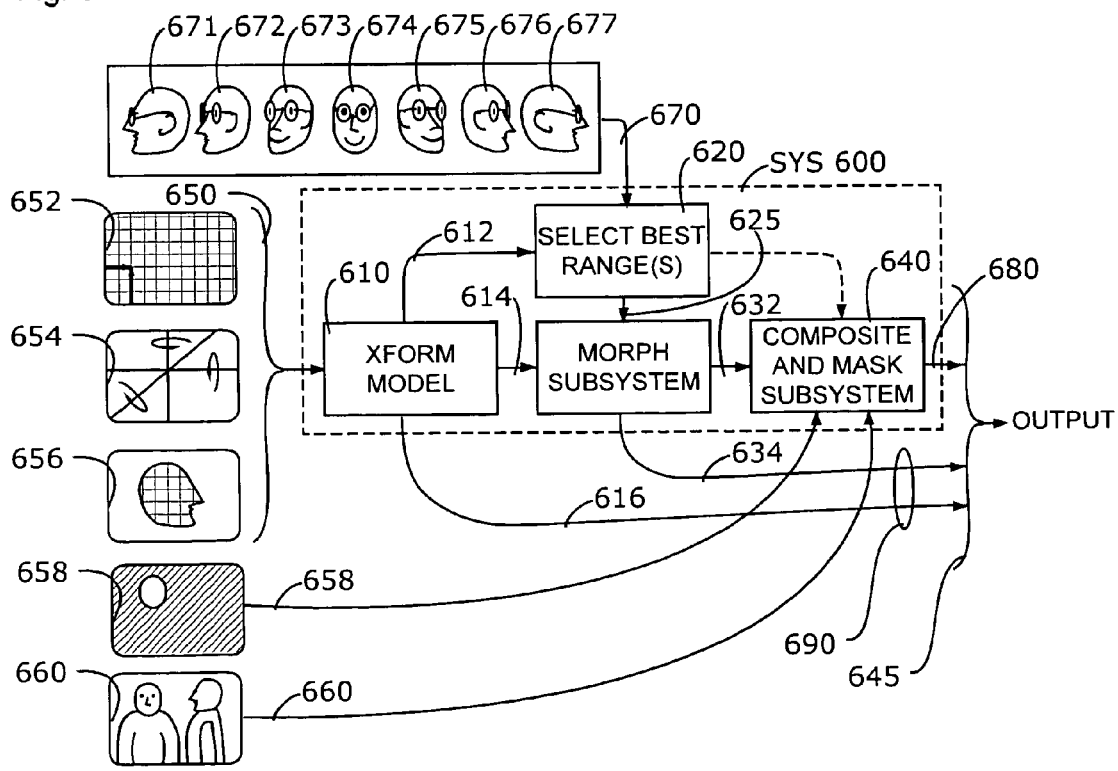
FIG. 6 shows a system block diagram of an alternate embodiment of the user image video processing and integration subsystem of the present invention.

FIG. 6 shows a system block diagram of an alternate embodiment of the user image video processing and integration subsystem. In FIG. 6, the subsystem 600 is comprised of a transform model subsystem 610, a image selection subsystem 620, a morphing subsystem 630, and a composite and masking subsystem 640. A collection of other program data 650 is further comprised of position information 652, rotation and orientation information 654; mesh geometry information 656, and masking information 658. The other program data 650 is supplied to the transform model subsystem 610 producing outputs 612, 614, and 616. Output 612 is coupled to the image selection subsystem 620. Database 670 is comprised of a series of individual images 671, 672, 673, 674, 675, 676, 677. These images are supplied to the image selection subsystem 620. On the basis of information supplied to the image selection subsystem 620 via the bus 612, one or more of the plurality of images 670 are then supplied via bus 625 to the morph subsystem 630.

The morph subsystem 630 uses image data supplied on 625, and transform model information supplied on 614 to produce a morphed image on output 632, which is then supplied to the composite and mask subsystems 640. The program video 660 is also supplied to the composite and mask subsystem 640, and the mask 658 is also supplied to the composite mask subsystem. The composite mask subsystem then produces an output 680 consisting of output video. Additionally, data outputs from the transform model subsystem and from the morph subsystem are output respectively on 616 and 634, producing output bus 690. Outputs 680 and 690 collectively are the output content bus 645. In this alternate embodiment, one or more of the selection of images in the database 670 is morphed or otherwise blended by the morph subsystem together to produce an output image 632 representative of what the mesh geometry information would look like. This is a less computationally-intensive way of producing the appearance of a rendered texture map wrapped around a mesh geometry at the expense of having to store a plurality of individual images in the database 670. The selection of best images can be performed by a general purpose computer running a very simple algorithm, such as selecting the best fit image or the two physically adjacent best fit images, and blending the two images together, or performing a morph operation on them, wherein the output image is akin to a linear interpolation between the two input images from the database. The transform model subsystem can be implemented on a general purpose computer, using algorithms as previously disclosed as being part of standard computer graphics text. Similarly, the morph subsystem is well understood and easily implemented on a general purpose computer, using information from the same references. The composite and mask subsystem 640 is substantially the same as the composite and mask subsystem 530 of FIG. 5, and thus produces no new difficulties in operation. Clearly, the preferred methodology is to use a texture map and real geometry mesh information as illustrated in FIG. 5, because it allows you to render the texture map as visible from any particular point. The operation of the system as shown in FIG. 6 is not as preferable, because poor results are obtained unless the number of images available to select from is reasonably large. For example, to have images available at increments of every 15° in a 360° rotation would probably be about the minimum number of images one would require to have any reasonable output quality. As the number of input images increases, and the angular separation between input images decreases, one would get correspondingly better results. With sufficient images available in the database 670, the morph subsystem would no longer be required. The image selection subsystem would be able to pick exactly the correct image and output that data directly into the composite and mask subsystem 640 via the optional bus 627.

In regards to other program data referenced numerous places: The other program data may consist of information as previously disclosed in FIGS. 5 and 6 such as position, rotation, orientation, mesh geometry, or mask. It may consist of a subset of one or more of those entities. It may additionally comprise other information, such as placement information for a surround sound system, information about local lighting, as was used to originally produce the program video content, which would allow correct lighting of a rendered model; and information about objects that might partially obscure the rendered image, such as a costume or other item that must be associated with the inserted user image data.

FIG. 7 shows a block diagram of a tracking subsystem 700 which accepts a first audiovisual presentation comprised of a visual picture image 710 and performs processing on that presentation. The processing determines a plurality of types of output information, which may include position information 720, rotation orientation information 730, mesh geometry information 740, mask 750, and other correlation data 760. The image is analyzed by the tracking subsystem 700 using general information known by the tracking subsystem 700 about the visual picture image 710. This general information may comprise expected position information, expected timing information, and expected presence detection information.

The analysis determines if a selected reference object appears in the visual picture image 710. In the example as depicted in FIG. 7, the visual picture image 710 includes a reference object face 711 in the depicted example image frame. In the example of FIG. 7, the face 711 is detected to be present. The tracking subsystem 700 may compute the location of the face 711 within the frame and output that information as position information 720.

Once a position has been determined, the tracking subsystem may now compute the rotation orientation information associated with the reference object face 711. This computation is responsive to knowledge about the reference object. An example of the knowledge about the reference object would be knowing that the eyes of the face 711 would be equidistant from the bottom of the frame of the visual picture image 710 if the face itself were level. Based on detecting the location of the reference object face 711, the tracking subsystem then may determine the location of each eye, compare them against the bottom of the frame, and then compute and output the rotation orientation information 730. In one embodiment, the rotation orientation information 730 comprises two-dimensional single-axis rotation information about the position information 720. In another embodiment, the rotation orientation information 730 comprises three-dimensional rotation information about a plurality of axes.

In an embodiment of the present invention, the general information known by the tracking subsystem 700 may include reference object mesh geometry information. In a preferred embodiment, the reference object mesh geometry information is selectively transformed responsive to the position information 720 and the rotation orientation information 730, producing an output of mesh geometry information 740.

The reference object mesh geometry information comprises at least one kind of data structure. In a preferred embodiment, the mesh geometry data structure describes a sampling of points on a surface a reference object. In another preferred embodiment, the mesh geometry data structure describes a sampling of points on a surface of a reference object and their relative connections, thus defining wire-frame geometric information about the reference object. In a different preferred embodiment, the mesh geometry data structure comprises the definitions of a plurality of polygons, each polygon representing a portion of a surface of the reference object. In another preferred embodiment, the mesh geometry data structure comprises the definitions of a plurality of curves which intersect to form the surface of the reference object. The definitions of these curves may include but are not limited to splines, B-splines, NURBS, simple curves, quadratic curves, higher order curves, and interpolated curves. One or more of the different kinds of mesh geometry data structures disclosed may be included to comprise the reference object mesh geometry information.

In a preferred embodiment, the computation to produce the mesh geometry information 740 assists the determination of the position information 720 and the rotation orientation information 730 in a closed loop fashion. In this embodiment, the result of transforming the reference object mesh geometry information is compared against the detected reference object, in this example the face 711, to determine if the position information 720 and the rotation orientation information 730 are consistent with the reference object. The computation of the position information 720 and the rotation orientation information 730 may be modified by the comparison against the detected reference object, producing new outputs of position information 720, rotation orientation information 730, and mesh geometry information 740. In this embodiment, the computations are repeated until the tracking subsystem 700 determines that the output computed is best representative of the position and rotation of the reference object face 711 in the visual picture image 710.

The tracking subsystem 700 may compute an mask 750 which represents the region of the reference object within the visual picture image 710, in this example the face 711. The mask may be output as a video output key signal. The mask may be output as a image alpha channel. The mask may be output in an encoded form. In a preferred embodiment, the mask is opaque in the region of the reference object and clear elsewhere. In another embodiment, the mask is clear in the region of the reference object and opaque elsewhere. In another preferred embodiment, the delineation between the opaque region and the clear region of the mask may comprise a band of user-selectable width which blends smoothly from opaque to clear over the band's width.

FIG. 8 shows a block diagram of a tracking subsystem 800 which accepts a first audiovisual presentation comprised of a time-ordered sequence 810 of visual picture images (images) and performs processing on that presentation. The processing determines a plurality of types of output information, which may include position information 820, rotation orientation information 840, mesh geometry information 850, mask 860, and other correlation data 870. Each image in the time-ordered sequence 810 is analyzed by the tracking subsystem 800 using general information known by the tracking subsystem 800 about the images in the time-ordered sequence 810.

The general information known by the tracking subsystem may comprise expected position information, expected timing information, and expected presence detection information for one or more of the visual picture images. In the preferred embodiment, the general information is stored within a frame database storage subsystem 820. In this embodiment, the general information includes data corresponding to a plurality of the visual picture images in the time-ordered sequence 815. This information may comprise entries per scene, entries per frame, and entries per predefined time period. The general information may be provided in a pre-recorded fashion. The general information may be provided with the first audiovisual presentation.

The analysis determines if a selected reference object appears in each image in the time-ordered sequence 810. In the example as depicted in FIG. 8, a selected visual picture image 815 of the sequence includes a reference object face 811. The tracking subsystem 800 may compute the location of the face 811 within the frame 815 and output that information as position information 830.

Once a position has been determined, the tracking subsystem may now compute the rotation orientation information associated with the reference object face 811. This computation is responsive to knowledge about the reference object. An example of the knowledge about the reference object would be knowing that the eyes of the face 811 would be equidistant from the bottom of the frame of the visual picture image 815 if the face itself were level. Based on detecting the location of the reference object face 811, the tracking subsystem then may determine the location of each eye, compare them against the bottom of the frame, and then compute and output the rotation orientation information 840. In one embodiment, the rotation orientation information 840 comprises two-dimensional single-axis rotation information about the position information 830. In another embodiment, the rotation orientation information 840 comprises three-dimensional rotation information about a plurality of axes.

In an embodiment of the present invention, the general information known by the tracking subsystem 800 may include reference object mesh geometry information. In a preferred embodiment, the reference object mesh geometry information is selectively transformed responsive to the position information 830 and the rotation orientation information 840, producing an output of mesh geometry information 850.

In a preferred embodiment, the computation to produce the mesh geometry information 850 assists the determination of the position information 830 and the rotation orientation information 840 in a closed loop fashion. In this embodiment, the result of transforming the reference object mesh geometry information is compared against the detected reference object, in this example the face 811, to determine if the position information 830 and the rotation orientation information 840 are consistent with the reference object. The computation of the position information 830 and the rotation orientation information 840 may be modified by the comparison against the detected reference object, producing new outputs of position information 830, rotation orientation information 840, and mesh geometry information 850. In this embodiment, the computations are repeated until the tracking subsystem 800 determines that the output computed is best representative of the position and rotation of the reference object face 811 in the visual picture image 815.

The tracking subsystem 800 may compute an mask 860 which represents the region of the reference object within the visual picture image 815, in this example the face 811. The mask may be output as a video output key signal. The mask may be output as a image alpha channel. The mask may be output in an encoded form. In a preferred embodiment, the mask is opaque in the region of the reference object and clear elsewhere. In another embodiment, the mask is clear in the region of the reference object and opaque elsewhere. In another preferred embodiment, the delineation between the opaque region and the clear region of the mask may comprise a band of user-selectable width which blends smoothly from opaque to clear over the band's width.

A preferred embodiment of the present invention comprises a source of a first audiovisual presentation, a source of user audiovisual information, correlation means, association means, and compositing means. The first audiovisual presentation may comprise an external source of program content 110. The source of user audiovisual information may comprise user image content 130. A user image video processing and integration subsystem 600 may comprise the correlation means, association means, and compositing means. An image selection subsystem 620 may comprise the correlation means and the association means. A compositing and masking subsystem 640 may comprise the compositing means of this preferred embodiment. A tracking subsystem 700 may comprise the correlation means.

The first audiovisual presentation comprises a plurality of forms of information. One of the forms of information in the first audiovisual presentation is a visual picture, also known as program content video 120. This visual picture may vary over a period of time, as in a conventional motion picture (movie) or television program (show), such as conveyed by a conventional video signal. A visual picture varying over a period of time may comprise a time-ordered sequence of a plurality of images, where each image of the plurality is associated with a specific absolute or relative time. The visual picture may be a live presentation. The visual picture may be a pre-recorded presentation. The visual picture may be a static picture that does not vary over a period of time.

In an embodiment where the visual picture comprises a time-ordered sequence of a plurality of images, each image of the plurality may be represented in digital form. Conventional digital forms for images include raw uncompressed picture elements (pixels) and a variety of image encoding and image compression forms. A common image encoding form is Red Green Blue (RGB) encoding. Another common image encoding form is Joint Picture Experts Group (JPEG). An encoding of the plurality of images may comprise a first reference image, representing a selected first one of the plurality of images, and one or more data structures describing the difference between the selected one and a different second selected one image. This difference is sometimes referred to as delta encoding.

An example of a delta encoding technique is the Motion Picture Experts Group (MPEG) encoding standard. MPEG encoding periodically selects an image to be encoded in a format referred to as an I-frame, and places the encoded image data into a frame store. A next image in the time-ordered sequence is then compared against the frame store image and the differences between the frame store image and this next image are determined. The frame store is then updated to include the differences and a new next image is selected, whereupon the process described above for the next image is repeated with the new next image. The differences are generally referred to within the MPEG standard as P-frames and B-frames.

The sequence of an I-frame followed by one or more P-frames and B-frames may be repeated multiple times, and the resultant plurality of sequences is known as an MPEG program stream or an MPEG stream. The differences represented in P-frames and B-frames may be encoded in a variety of ways as defined by the MPEG encoding standard, and typically have a much reduced data storage requirement compared to the data associated with an I-frame. In one particular embodiment of an MPEG stream, the determining of differences between the frame store image and the next image is sensitive to blocks of adjacent pixels as a group appearing at one location in the frame store image and appearing at a different location in the next time. To encode this difference, only the designation of the group and the relative displacement from the frame store image to the next image need be encoded in the P-frame or B-frame. This particular kind of difference is commonly known as an MPEG motion vector, as it describes the relative motion of a group of pixels from one picture to the next. An MPEG motion vector is sometimes referred to simply as a motion vector.

An MPEG decoder processes an MPEG stream by first decoding the data encoded in an I-frame to produce an output image frame in a frame store. After the MPEG decoder processes an I-frame, it may then process and decode one or more P-frames to modify the data in the frame store, thereby producing an additional output image for each P-frame. In this way, a time-ordered sequence of images may be reconstructed from an MPEG stream.

A reference object is another form of information comprising the first audiovisual presentation. Another form of information comprising the first audiovisual presentation is a reference point. A reference point typically defines a location on a reference object. There may be many reference points associated with a reference object. There may be multiple reference objects all associated with a same reference point, if those multiple reference objects are all touching. Reference objects and reference points may be contained wholly or in part within other program content data 115 and program content video 120.

The reference object may be conveyed in a manner separate from the visual picture but at the same time within the first audiovisual presentation, in a manner analogous to a sound track or subtitle information being conveyed along with a conventional motion picture or television program. In an embodiment where the reference object is conveyed in a manner separate from the visual picture, reference object information is encoded in data structures that are well suited to automated processing by a general purpose computing device, and the other program content data 115 additionally comprises the reference object information.

The reference point may be conveyed in a manner separate from the visual picture but at the same time within the first audiovisual presentation, in a manner analogous to a reference object. In an embodiment where the reference point is conveyed in a manner separate from the visual picture, reference point information is encoded in data structures well suited to automated processing by a general purpose computing device, and the other program content data 115 additionally comprises the reference point information.

The reference object may be embedded within the visual picture. In an embodiment where the reference object is embedded within the visual picture, the present invention includes means to analyze the visual picture to detect the embedded reference object. This may be accomplished by image recognition means.

Known forms of image recognition include image matching, where an image provided to the invention is compared and correlated against selected portions of the visual picture. The image is considered detected within the visual picture when the comparison and correlation exceed a threshold value.

Another known form of image recognition includes pattern matching, where a pattern having features is predefined and supplied to the invention. The invention performs processing on the predefined pattern and the visual picture to determine if features specified by the pattern appear in the visual picture. If sufficient features of the pattern are detected in the visual picture, the pattern is considered detected within the visual picture. Pattern recognition software and technology is well-known and commercially available.

For example, the "MATE" system from Israel is used to rapidly scan still pictures of suspects from a security camera and compare them against a database of pictures of known criminals. This system searches the still pictures from the security camera for distinctive facial features, using such known image processing techniques as edge detection, feature sizing, and feature orientation, and does not require that the still pictures have absolutely consistent placement, orientation, and size. There are also many textbooks and trade journals on this subject.

In the embodiment of the present invention where a reference object is embedded within the visual picture, the program content video 120 additionally comprises reference object information. In the embodiment where a reference point is embedded within the visual picture, the program content video 120 additionally comprises reference point information.

As described above, an MPEG motion vector conveys information about the relationship between a first image and a second image in a time-ordered sequence. This information can be encoded in a very efficient manner in an MPEG stream. Although the motion vector technically describes merely the displacement of pixels from the first to the second image, within the context of the present invention it can additionally be interpreted as an indication of the distance and direction by which a reference object in the first audiovisual presentation moves within that presentation. In a preferred embodiment, the correlation means of the present invention uses the motion vector information in the first audiovisual presentation to describe the displacement of identified reference points from a first detected location to another location. This first-order object transformation enables this preferred embodiment of the present invention to estimate the actual position of reference points as they may move from frame to frame, using the MPEG motion vectors as a guide. The advantage to using motion vector information can mean less processing is required by the correlation means to determine the actual position of the reference points.

The user audiovisual information comprises a plurality of forms of information. One of the forms of information in the user audiovisual information is a replacement object image, also known as user image data 135. The user image data 135 may comprise a user specified image 137. The user image data 135 may comprise a plurality of user images 671, 672, 673, 674, 675, 676, 677. Another form of information in the user audiovisual information is a replacement point.

A replacement point is another form of information comprising the user audiovisual information. A replacement point typically defines a location on a replacement object image. There may be many replacement points associated with a replacement object image. There may be multiple replacement object images all associated with a same replacement point, where the replacement point defines a common location on each of the replacement object images. Replacement object images and replacement points may be contained wholly or in part within other user data 132 and user specified image data 137.

In an embodiment where the replacement object image is conveyed in a manner separate from the user specified image 137, the replacement object image is encoded in data structures that are well suited to automated processing by a general purpose computing device, and the other user data 132 additionally comprises the replacement object image.

The replacement point may be conveyed in a manner separate from the user image 137 but at the same time within the user audiovisual information, in a manner analogous to a sound track or subtitle information being conveyed along with a conventional motion picture or television program. In an embodiment where the replacement point is conveyed in a manner separate from the user image 137, replacement point information is encoded in data structures that are well suited to automated processing by a general purpose computing device, and the other user data 132 additionally comprises the replacement point information.

Because a reference object might not be associated with every visual picture in the first audiovisual presentation, the present invention must determine if and when a reference object is so associated. This determination is generally performed by the correlation means. In a preferred embodiment, the correlation means correlates at least one reference point with at least one replacement point. The correlation uses information about the reference object to determine the location of a reference object within the first audiovisual presentation. This information about the reference object may be determined by detecting the embedded reference object, as described above, via image recognition or pattern recognition means.

In an alternate embodiment, the information about the reference object may be provided in other program content data 115. The information about the reference object may include its position within the visual image, a rotational orientation, color information, size information, geometric information such as a wire-frame mesh, mask information, and other information. The information about the reference object may further comprise locations of one or more reference points on the reference object. The locations of the reference points may be specified with respect to a location in the visual image, or with respect to a location on the reference object.

Examples of the reference object within the first audiovisual presentation may include a special marker inserted in the production of the presentation, a face, a graphic feature, and any image of any item that can be distinguished from any other items that may be visible in the same visual image of the first audiovisual presentation. The correlation means distinguishes the reference object from any other objects that may be present in the visual image.

Once the reference object has been identified within a visual picture in the first audiovisual presentation, the correlation means can use that detection coupled with knowledge about the reference object to detect one or more reference point locations within the visual picture. The correlation means detects, infers, or otherwise recognizes reference points present on reference objects. For example, if the reference object is a face, once the correlation means has identified the face within a visual picture, it is a straightforward image recognition process to determine the position of the major features of the face, such as eyes, nose, and mouth. The positions of each of the major features thus determined are used to establish the location of reference points. For example, if the reference object is a face, the list of useful reference points may include the center of each pupil of each eye, the tip of the nose, points selected along the line of the lip at some spacing interval, and so forth. Other kinds of reference objects may have other reference points, for example, distinctive locations on the surface or interior of a car, the outline of a chair on a set, and so forth.

The association means associates a detected reference object with one or more replacement object images. This association uses the information provided by the correlation means. For example, if the reference object is a face and the reference point locations include the center of the pupil of each eye, the association means will associate the reference object with a replacement object image of another face, and it will associate the locations of the center of the pupil of each eye in the reference face with the locations of the center of the pupil of each eye in the replacement object image. In a preferred embodiment, this process is responsive to a database with information about each of the replacement object images. The database information includes what kind of replacement object each replacement object image represents, the parameters of each replacement object image, and locations of selected replacement points in each replacement object image.

The kinds of replacement object images used by the invention include any kinds of images that may be contained within an audiovisual presentation. The parameters of each replacement object image may comprise identification of the subject of the image, a boundary of the relevant portion of the image, a mask related to the image, the characteristics and location of one or more light sources providing illumination for the replacement object image, and so forth. Parameters may include, for example, which diphthong or sound a person was making with their mouth when an image of their face was recorded. The locations of selected replacement points may include locations within the replacement image of the center of each pupil of each eye, the tip of the nose, points selected along the line of the lip at some spacing interval, and so forth.

The invention then replaces a portion of the first audiovisual presentation with a portion of the associated replacement object image. The portion of the first audiovisual presentation selected is determined by the associated reference object. It is not necessary to remove the selected portion of the first audiovisual presentation. In a preferred embodiment, the portion of the associated replacement object image is overlaid on the reference object in the first audiovisual presentation. The overlayment will obscure or replace a portion of the first audiovisual presentation, and is similar in nature to a video post-production effect commonly known as keying.

Keying comprises selectively overlaying a first video image on top of a second video image, where in some portions of the video frame portions of the first video image are visible, and where in some portions of the video frame portions of the second video image are visible. The keying region may be determined by geometry, for example selecting a rectangular window. Keying with a rectangular window is commonly performed in television newscasts in the United States, where a news reporter is visible in the image and a rectangular graphic or icon is shown above and to the side of the news reporter's shoulder. In this common example, the graphic or icon comprises the first video image, and the second video image includes the news reporter and the associated surroundings. The keying is accomplished by using a video mixer, which selectively chooses proportions of signals from the first video image and the second video image, responsive to a mask. In this common example, the mask is generated from the dimensions of the graphic or icon in the first video image. The mask itself is sometimes referred to as a key.

The keying region may be determined by other means. Another common variant of keying is called luminance keying. In luminance keying, a video mixer selectively chooses proportions of signals from a first video image and a second video image responsive to the luminance value at each point in a keying video image. The keying video image may be either one of the first and second images, or it may be an independent third image. Sometimes the keying video image is referred to as an alpha channel, alpha mask, or alpha key.

Another common variant of keying is called chrominance keying. In chrominance keying, a video mixer selectively chooses signals from a first video image and a second video image responsive to the chrominance value at each point in a keying video image. The keying video image may be either one of the first and second images, or it may be an independent third image. Chrominance keying is sometimes referred to as blue-screen keying, blue-screen compositing, or simply blue-screen, because early implementations of chrominance keying could only distinguish the presence or absence of a brilliant saturated blue color in the keying video image. Modern chrominance keying is much more tolerant of the level of saturation and brightness required. Modern chrominance keying has also been implemented using saturated colors other than blue, with green and blue-green hues being the most commonly used.

A common example of chrominance keying in operation is a weather report as in television newscasts in the United States, where a weather reporter is shown gesturing at a map appearing in the background of the image. In practice, the weather reporter is usually performing in front of a flat, featureless colored backing, typically of a selected deeply saturated bright color, in view of a camera. The production staff usually expends great effort to ensure the color of the screen is substantially different from any color that may appear on the weather reporter's person or clothing. The signal from the camera is supplied both as the first video image and the keying video image. A video signal representing a weather map is supplied as the second video image. The video mixer, responsive to detecting the deeply saturated color, will select proportionally more of the second video image. The video mixer, responsive to not detecting the deeply saturated color, will select proportionally more of the first video image. The output of the video mixer is a video signal where the weather reporter appears as if performing in front of a weather map. Various refinements exist for correcting second-order effects, such as color spill, flare, and reflections from the colored backing. Chrominance keying technology is commercially available, such as from Ultimatte, and are well described in the literature.

In a preferred embodiment of the present invention, the compositing means generates a key or mask from information known about the replacement object image. The information known about the replacement object image may include its boundary, regions or holes in its interior, and information about its transparency. The key selects which portions of the replacement object image appear on top of, and obscure, portions of the first audiovisual presentation. The output of the compositing means comprises an integrated display audiovisual presentation, or an integrated audiovisual presentation.

In preferred embodiments of the present invention, the replacement object images comprise a series of images, for example as shown in FIG. 6, 671, 672, 673, 674, 675, 676, and 677, representing the replacement object in a variety of poses, orientations, lighting, and sizes. Other kinds of replacement object image series include each of a number of facial expressions or body language, images of a face saying different vowel and consonant sounds, and so forth. The present invention selects among the available replacement object images for the best image to use in the compositing means.

In a preferred embodiment of the present invention, the compositing means additionally transforms one or more of the replacement object images associated with a reference object. The transformation is responsive to information from the correlation means. The replacement object image may have any conventional image transformation applied to it to modify the replacement object image to better integrate into the final output.

Conventional image transformations as implemented in general purpose computing platforms are documented in computer graphics literature, and include mapping, stretching, shrinking, rotating, scaling, zooming, curling, shearing, distorting, and morphing. The compositing means selects from the available image transformations and applies them selectively to obtain the best results. For example, if the correlation means determines that a replacement object representing a face is detected at some angle A, then the compositing means may apply a rotation of the same angle A to the replacement object image before combining or overlaying the replacement object image onto the first audiovisual presentation.

A shrinking transform uniformly reduces the size of a replacement object image. A zooming transform uniformly enlarges the size of a replacement object image. A stretching transform may simultaneously shrink and enlarge the size of a replacement image, where the shrinking and enlarging are by necessity at different directions. A scaling transform may selectively shrink or enlarge the size of a replacement image. A rotation transform may be a two dimensional rotation of the replacement image about a point, or a three dimensional rotation of the replacement image about a plurality of axes defined in three dimensions. A shearing transform selectively skews portions of a replacement object image along a selected direction. A curling transform creates the appearance of curling a two dimensional surface on which the replacement object image resides in three dimensions. A mapping transform is any regular relationship that can be expressed between a replacement object image and the result of the mapping. A morphing transform is any irregular relationship that can be expressed between a replacement object image and the result of the morphing. Not all of these image transformation terms are mutually exclusive. For example, a mapping transform is a degenerate case of morphing, and a shrinking transform is a degenerate case of scaling.

Morphing is described in detail in pp. 224-230, *Digital Image Warping*, George Wolberg, 1990, Computer Society Press, ISBN 0-8186-8944-7. Morphing is a graphical image transformation algorithm that operates on two arrays of coordinates, also known as locations, or points. The first array of coordinates represents points on a first visual image. The second array of coordinates represents points on a second visual image. There is a required exact one to one relationship between the first array of coordinates and the second array of coordinates. The algorithm of morphing computes a local distortion of the first visual image so that each one of the coordinates in the first array is distorted and moved to align with the corresponding one coordinate in the second array, thereby producing the second visual image.

In contrast to morphing, the correlation, recognition, and association of reference objects containing reference points with replacement points on replacement object images of the present invention is less restrictive and more general. The present invention distinguishes above the known process of morphing in that there need not be an exact one to one correspondence between each and every one of the reference points and each and every one of the replacement points.

In a preferred embodiment, the user audiovisual information additionally comprises user object geometric information. The user object geometric information may describe any of the shape, size, orientation, surface characteristics, and other attributes of the replacement objects from which the replacement object images are derived. For example, the user geometric information may describe the geometry of a person's head in any of several positions, corresponding to replacement object images of the same head as viewed in each of those positions respectively. Alternatively, the user geometric information may describe the geometry of a person's head in a single position, and also comprise rotational and positional information based on that single position for each of a plurality of replacement object images.

In another preferred embodiment, the user object geometric information is geometrically transformed responsive to the recognition of a reference object. The recognition determines the position, rotation, scaling and sizing, clipping, local deformation, and other transform parameters to be applied to the user object geometric information. This embodiment produces an output of geometrically transformed user object geometric information. This information may, for example, be representative of the geometry of a user object such as a person's head, transformed by scaling, rotation and positioning so as to be properly scaled, rotated and positioned to line up with a reference object in the first audiovisual presentation. As the correlation means continues to recognize the reference object, the scaling, rotation, and positioning parameters are continually or periodically updated, resulting in updated transformed user object geometric information.

In another embodiment, the user audiovisual information comprises user object geometric information, and a user object replacement image that is representative of a pixel texture of the surface of a user object. In this embodiment, the pixel texture is visual image data that corresponds to viewing the object from all orientations. This pixel texture is commonly referred to as a texture map, a texture map image, or a texture. The pixel texture is comprised of pixels that represent the color of a user object, each at a specific and distinct location on the user object.

User object geometric information and a pixel texture permit the reconstruction of a view of a user object from any viewing position relative to that user object by sampling those pixels in the pixel texture that correspond to specific and distinct locations that are on a direct line of sight from the viewing position to the user object. The determination of direct line of sight is made by computing the position of the surface of the object relative to the viewing position. The computation of positions on the surface is based on the data comprising the user object geometric information.

The reconstruction of a view of a user object from any viewing position relative to that user object by sampling those pixels in the pixel texture that correspond to specific and distinct locations that are on a direct line of sight from the viewing position to the user object is one variant of an known family of computer graphics operations called texture mapping. In texture mapping, the pixels comprising a visual image surface are mathematically mapped onto a second surface. The mapping is general, in that it may comprise a many to one mapping and a one to many mapping. The resultant appearance can be very much like the effect of stretching an image printed on a flexible, extensible sheet around another object, for example a pre-printed logo on an originally flattened rubber balloon. The texture map represents the logo as it is printed on the flattened balloon, and as the balloon is inflated the texture map continually deforms and stretches to conform to the shape of the balloon surface. There is a mathematical relationship between the a point in the logo on the originally flattened balloon, and the same point on the logo on the inflated balloon. The mathematical relationship is a mapping, and in this balloon example it varies somewhat from point to point on the surface of the balloon. In an analogous fashion, the user replacement object image is a texture map, and the user object geometric information is analogous to the inflated balloon geometry. Of course, the user object geometric information is generally more complex that the simple convex geometry of an inflated rubber balloon.

In a preferred embodiment, the user audiovisual information comprises user object geometric information and a pixel texture, and the user object geometric information is geometrically transformed responsive to the recognition of a reference object. The pixel texture (or texture map), in combination with the transformed user object geometric information, permits the reconstruction of the appearance of the user object in the same placement and orientation as the detected reference object.

Note that in this preferred embodiment, the appearance of the user object may be reconstructed even though the system of the present invention may not have an actual replacement object image of the user object in that particular detected placement and orientation of the reference object. The present invention may select from the available replacement object images, combining them as necessary using the user object geometric information, to produce an output of a new user replacement object image synthesized from the components of the existing available replacement object images.

In another preferred embodiments of the present invention, the replacement object images comprise a series of images representing views of a replacement object in a time-ordered sequence. In this embodiment, once the present invention selects among the available replacement object images for the best image to use in the compositing means, subsequent images in the time ordered sequence may be selected automatically as a result of the best image selection. In this embodiment, the processing load required is unchanged for the selection of the best image, but can be considerably reduced for subsequent images in the time-ordered sequence. For example, if the present invention determines that a reference object is a person's face and that person is winking, a selection of a time-ordered series of replacement object images comprising a corresponding wink may be selected. Each replacement object image in the time-ordered sequence may then be used in sequence with significantly lower processing overhead required once the initial association of winking reference face and winking replacement object image sequence is made.

In an analogous preferred embodiment of the present invention, the replacement object images comprise a series of images representing masks of a replacement object in a time-ordered sequence. In this embodiment, once the present invention selects among the available replacement object images for the best mask to use in the compositing means, subsequent masks in the time ordered sequence may be selected automatically as a result of the best mask selection. In this embodiment, the processing load required is unchanged for the selection of the best image, but can be considerably reduced for subsequent images in the time-ordered sequence. For example, if the present invention determines that a reference object with an irregular surface and outline is rotating, a selection of a time-ordered series of replacement object images comprising a corresponding sequence of pre-computed masks may be selected. Each replacement object image mask in the time-ordered sequence may then be used in sequence with significantly lower processing overhead required.

Examples of known point data structures that are well suited to processing by a general purpose computing device include but are not limited to Cartesian coordinates and polar coordinates. Each of these point data structures has two dimensional, three dimensional and higher order forms. Each coordinate is a number that may be represented in any of integer, fixed decimal, and floating decimal formats, with the precision of each coordinate determined by the requirements of any particular application of the present invention. The numbers are commonly associated with each other via a common data structure. The point data structures may be implemented with conventional arrays, linked lists, multiply-linked lists, heaps, and other data structures well known in the relevant field.

Examples of known object data structures that are well suited to processing by a general purpose computing device include, but are not limited to, points with connecting lines, wire frame representation, polygons, patches, surfaces of revolution, bounding boxes and bounding spheres, and so forth. These data structures may be implemented with conventional arrays, linked lists, multiply-linked lists, heaps, and other data structures well known in the relevant field.

Figure 9A:
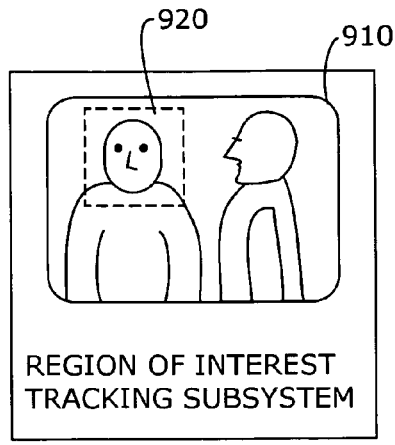
FIG. 9A is a representation of a region of interest of a preferred embodiment of the present invention.

FIG. 9A represents an example region of interest 920 within a frame of visual image data 910. The region of interest is identified in this example by a rectangular dashed outline. In a preferred embodiment of the present invention, the first audiovisual presentation includes information about a region of interest. The region of interest information describes a region in a visual image frame of the first audiovisual presentation, and therefore also defines the area outside of and excluded by the region of interest within the visual image frame. In this preferred embodiment, the region of interest information is used to direct the correlation means to attempt to recognize reference objects only within the region of interest, and not to waste processing cycles on visual image data outside the indicated region of interest. In a preferred embodiment, the region of interest varies from frame to frame in a time-ordered sequence. The varying may be regular or irregular.

Figure 9B:
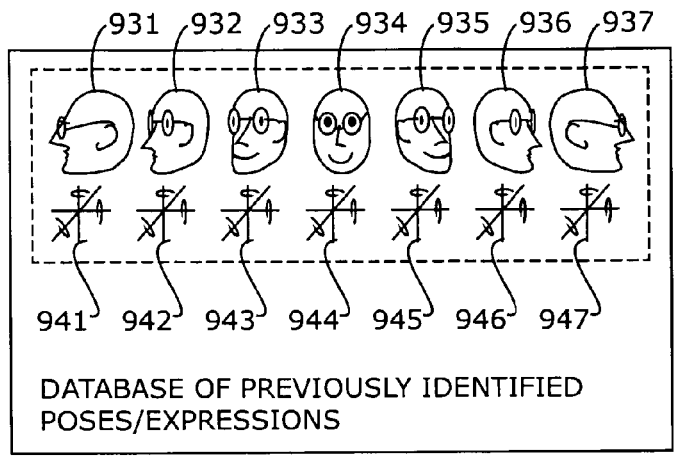
FIG. 9B is a representation of a database as in another preferred embodiment of the present invention.

FIG. 9B represents a database of user replacement images and user geometric information as in a preferred embodiment of the present invention. The database comprises a plurality of user replacement object images 931, 932, 933, 934, 935, and 936. The database further comprises a plurality of user geometric information data structures 941, 942, 943, 944, 945, and 946. Each of the plurality of user replacement object images is associated with a respective user geometric information data structure. In this preferred embodiment, the compositing means may select from the user replacement object images based on determining the best match between a detected reference object position and orientation, and selected ones of the user geometric information data structures in the database.

In another preferred embodiment, user geometric information data structures may comprise any ones of position information, rotation orientation information, mesh geometry information, masks, and other replacement data.

Figure 9C:
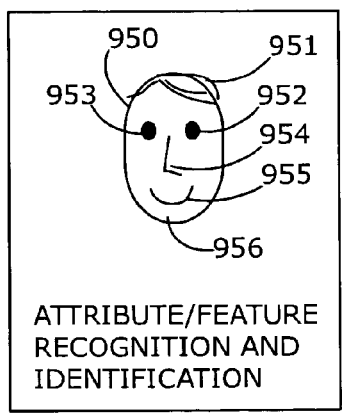
FIG. 9C is a representation of a reference object as in a preferred embodiment of the present invention.

FIG. 9C is a representation of an example reference object as in a preferred embodiment of the present invention. In the depicted example, the reference object is a face 950 that has associated with it a plurality of reference points 951, 952, 953, 954, 955, and 956. Reference point 951 indicates the location of a hairline on face 950. Reference point 952 indicates the location of an eye on face 950. Reference point 953 indicates the location of another eye on face 950. Reference point 954 indicates the location of a nose on face 950. Reference point 955 indicates the location of a corner of a mouth on face 950. Reference point 956 indicates the location of a chin on face 950. In a preferred embodiment, a selection of these reference points 951, 952, 953, 954, 955, and 956 are recognized and associated with a selection of user replacement object points.

Figure 10:
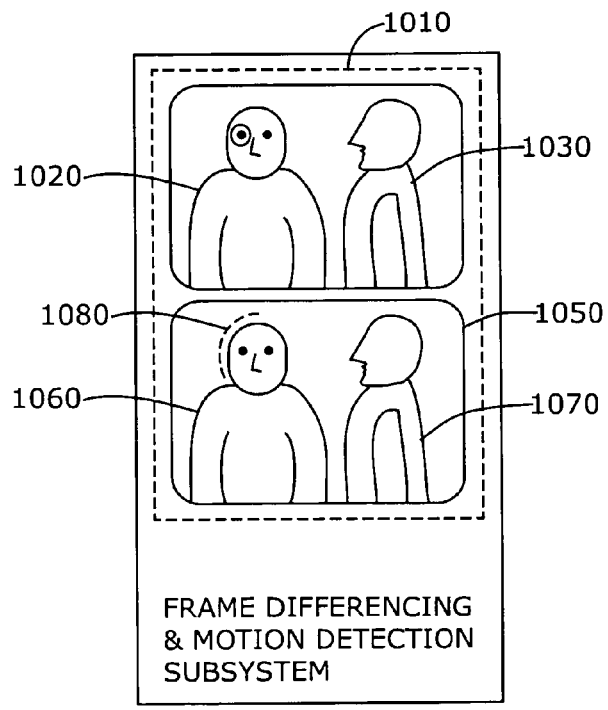
FIG. 10 is a representation of a frame difference as in another preferred embodiment of the present invention.

FIG. 10 is a representation of an example frame difference as in another preferred embodiment of the present invention. A first frame 1010 is representative of a frame of visual image data in the first audiovisual presentation at a first time. A second frame 1050 is representative of a frame of visual image data in the first audiovisual presentation at a second time. Frames 1010 and 1050 comprise visual image data of the same two individuals at different points in a time-ordered sequence of visual images. As shown in first frame 1010, the left person is in a position as indicated by 1020 and the right person is in a position as indicated by 1030. As shown in second frame 1050, the left person is in a position as indicated by 1060 and the right person is in a position as indicated by 1070. In this example, the position of the right person 1030, 1070 within each frame of the time-ordered sequence is constant for these two frames 1010, 1050. Also in this example, the position of the left person 1020 changes slightly rightward to position 1070, as referenced to the two frames 1010, 1050. A frame differencing means of this preferred embodiment of the present invention processes the frames 1010 and 1050 to produce a region 1080 that describes the area of the visual image frame in which a difference between the two frames 1010, 1050 exists. In this preferred embodiment, the difference is used to determine which areas of the first audiovisual presentation may require further correlation and association. In this preferred embodiment, portions of the first audiovisual presentation that are unchanged from frame 1010 to frame 1050 need not be further processed.

Figure 11:
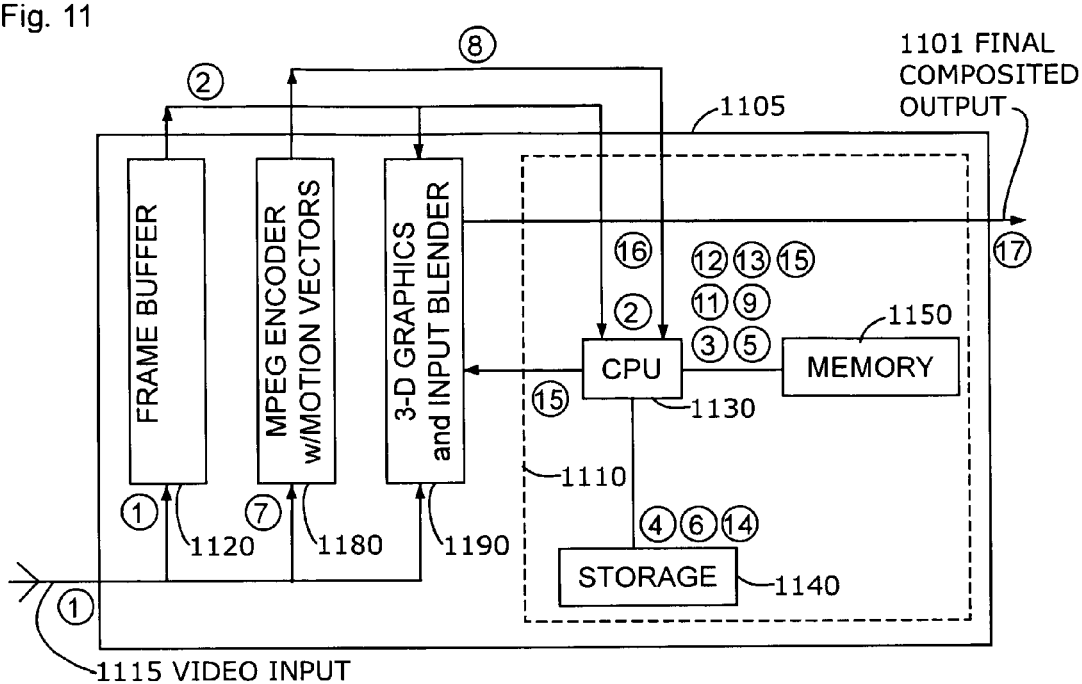
FIG. 11 is a detailed block diagram of a preferred embodiment of the system of the present invention comprising a compositing means within a three dimensional (3D) graphics engine.

FIG. 11 is a detailed block diagram of a preferred embodiment of the system of the present invention comprising a compositing means within a three dimensional (3D) graphics engine. The system 1105 comprises a frame buffer 1120, an MPEG encoder 1180, a three dimensional (3D) graphics engine and blender 1190, a general purpose computer 1110 comprising a central processing unit (CPU) 1130, a memory subsystem 1150, and a storage subsystem 1140. A first audiovisual presentation is provided to the system 1105 as a video input signal 1115. Video input signal 1115 is provided in parallel to frame buffer 1120, MPEG encoder 1180, and 3D engine 1190. Software running on the CPU 1130 performing a correlation function operates on data from the frame buffer 1120 to correlate and recognize reference objects in the first audiovisual presentation. In a preferred embodiment, the software is located in memory subsystem 1150, and may reference additional data in the storage subsystem 1140 and the memory subsystem 1150. The results of the correlation and recognition may be stored in either or both of the storage subsystem 1140 and the memory subsystem 1150.

The MPEG encoder 1180 produces an encoded representation of the video input signal 1115. In a preferred embodiment, the encoded representation comprises MPEG motion vectors, and the CPU 1130 processes motion vector information to assist in the tasks of correlation, recognition, and association. The CPU 1130 then associates a user replacement object image with the recognized reference object. The data for the user replacement object image may reside in either or both of the storage subsystem 1140 or the memory subsystem 1150.

The user replacement object data, which may comprise any or all of texture map data, user replacement object image data, and user geometry data, is relayed from the CPU 1130 to the 3D graphics engine 1190. In a preferred embodiment, the 3D graphics engine 1190 transforms the user geometry data producing transformed user geometric information, maps the texture map data onto the transformed user geometric information producing a replacement user object image. The 3D graphics engine 1190 then combines and blends the replacement user object image into the first audiovisual presentation, producing a final composited output 1199.

Figure 12:
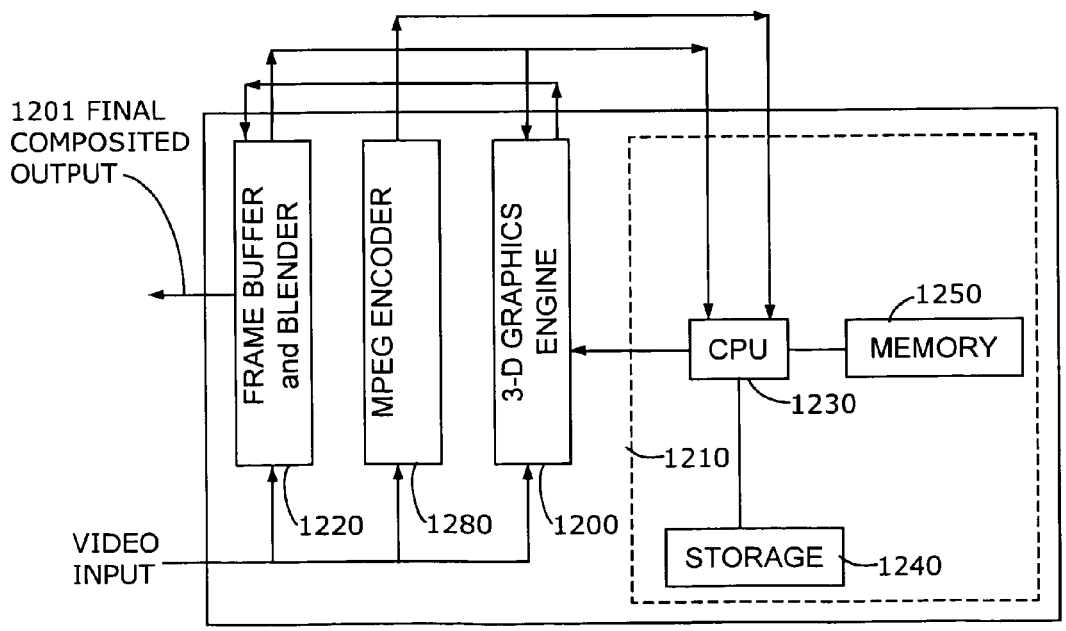
FIG. 12 is a detailed block diagram of a preferred embodiment of the system of the present invention comprising a compositing means within a frame buffer.

FIG. 12 is a detailed block diagram of a preferred embodiment of the system of the present invention comprising a compositing means within a frame buffer. The system comprises a frame buffer 1220, an MPEG encoder 1280, a three dimensional (3D) graphics engine 1290, a general purpose computer 1210 comprising a central processing unit (CPU) 1230, a memory subsystem 1250, and a storage subsystem 1240. A first audiovisual presentation is provided to the system as a video input signal 1215. Video input signal 1215 is provided in parallel to frame buffer and blender 1220, MPEG encoder 1280, and 3D engine 1290. Software running on the CPU 1230 performing a correlation function operates on data from the frame buffer and blender 1220 to correlate and recognize reference objects in the first audiovisual presentation. In a preferred embodiment, the software is located in memory subsystem 1250, and may reference additional data in the storage subsystem 1240 and the memory subsystem 1250. The results of the correlation and recognition may be stored in either or both of the storage subsystem 1240 and the memory subsystem 1250.

The MPEG encoder 1280 produces an encoded representation of the video input signal 1215. In a preferred embodiment, the encoded representation comprises MPEG motion vectors, and the CPU 1230 processes motion vector information to assist in the tasks of correlation, recognition, and association. The CPU 1230 then associates a user replacement object image with the recognized reference object. The data for the user replacement object image may reside in either or both of the storage subsystem 1240 or the memory subsystem 1250.

The user replacement object data, which may comprise any or all of texture map data, user replacement object image data, and user geometry data, is relayed from the CPU 1230 to the 3D graphics engine 1290. In a preferred embodiment, the 3D graphics engine 1290 transforms the user geometry data producing transformed user geometric information, maps the texture map data onto the transformed user geometric information producing a replacement user object image. The 3D graphics engine 1290 then relays the replacement user object image to the frame buffer and blender 1220, which combines and blends the replacement user object image into the first audiovisual presentation, producing a final composited output 1199.

Figure 13:
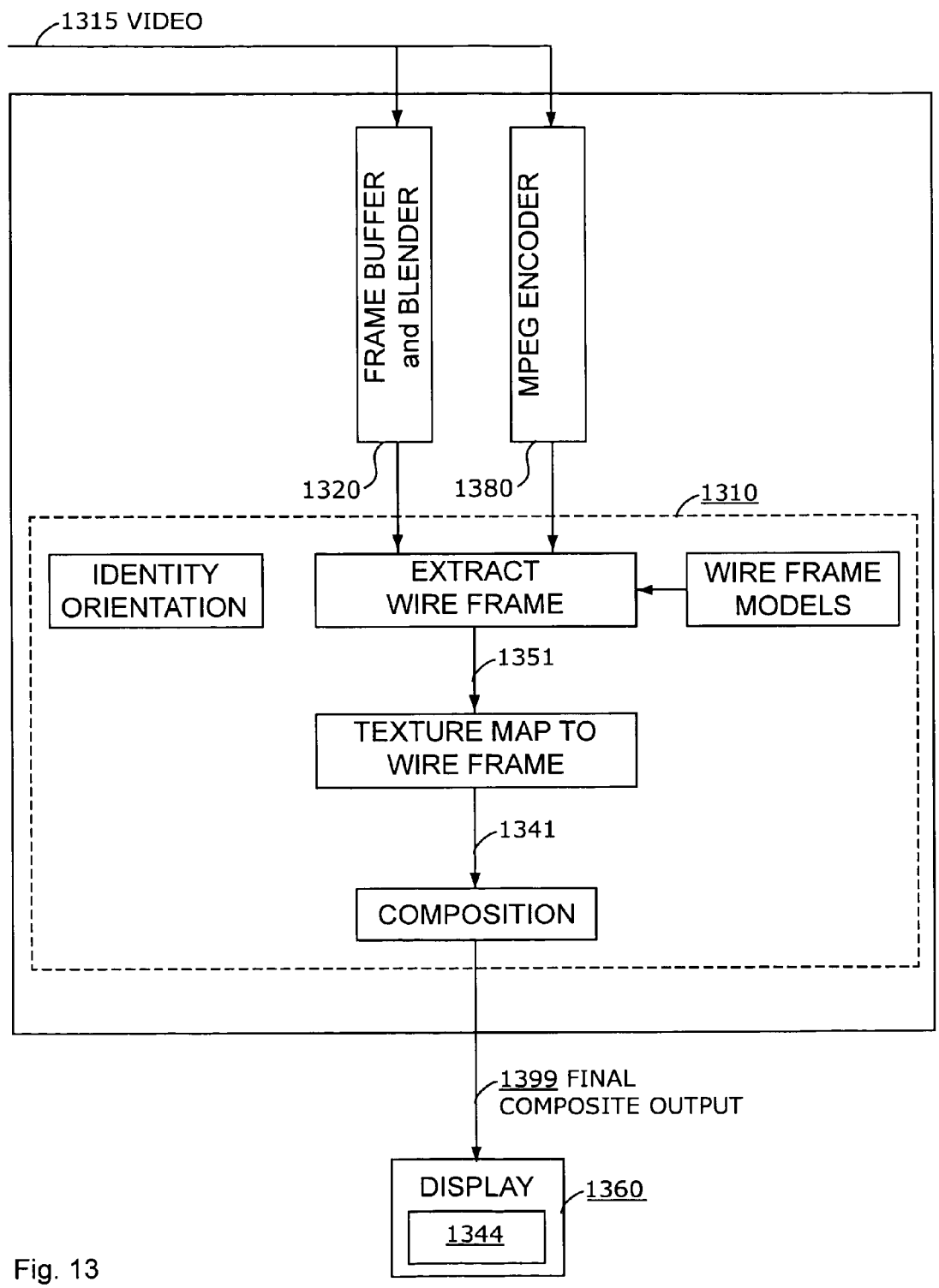
FIG. 13 is a detailed block diagram of a preferred embodiment of the system of the present invention implemented with a general purpose computer performing the compositing.

FIG. 13 is a detailed block diagram of a preferred embodiment of the system of the present invention implemented with a general purpose computer performing the compositing. The system comprises a frame buffer 1320, an MPEG encoder 1380, and a general purpose computer 1310. The system accepts a video input signal 1315 representative of the first audiovisual presentation and supplies that video input signal 1315 to frame buffer 1320 and MPEG encoder 1380.

The general purpose computer 1310 comprises an extract wire-frame means, a wire-frame model database, an orientation identification means, a mapping means, and a compositing means. The wire-frame model database comprises user geometric object information. An output of wire-frame model data is supplied to the extract wire-frame means. An output of the orientation identification means is supplied to the extract wire-frame means. The extract wire-frame means transforms the wire-frame model data, responsive to information from at least one of the frame buffer 1320 and the MPEG encoder 1380, and supplied transformed wire-frame model data 1351 to the mapping means. In a preferred embodiment, the functions of the extract wire-frame means, the orientation identification means, the mapping means, and the compositing means may be performed by software executing on the general purpose computer 1310.

The mapping means maps user replacement object images onto the transformed wire-frame model data 1351 producing a texture mapped output replacement object image 1341. The replacement object image 1341 is provided from the mapping means to the compositing means. The compositing means combines the replacement object image 1341 with data from the frame buffer 1320 producing final composited output 1399. The final composited output 1399 is representative of the first audiovisual presentation with selected portions being replaced by user object image content. In a preferred embodiment, the final composited output 1399 is provided as an input signal to display unit 1360, where it may be displayed as a display presentation 1344.

There are a number of different kinds of other user image data that may be included or input to the system, including but not limited to images of a user's face from different orientations, a full face texture map, a full head texture map, pictures of different parts of the user's body or their whole body, information about their eye color, skin color, hair texture and color, their preferred language, their age, their gender, their height, their weight, preferred style of attire, their name, music preferences. There may be multiple copies or instances of some of this data stored, for example, there may be a texture map for each of a plurality of facial expressions; there may be motion video stored, showing how the face moves and transitions from one particular expression to another expression, there may be voice samples, phonemes or allophones, phrases, key words; there may be an accurate 3-D map of the geography of the user's face or body. Information may include their birth date or favorite colors, or favorite foods, or favorite actors, city of their birth, and so on.

Non-image information is relevant because it is not necessarily only the user's image or the image of the user's face that might be inserted. Some of this other information might be used to generate other kinds of output. For example, the user's eye color might be used to similarly tint the eyes of an alien in a science-fiction show. Alternatively, the user's name might appear on the jersey of a player in some sort of organized sport.

An audio-visual presentation might have a number of predefined choices, wherein a particular course of action might be dependent on some of the user's preferences that are recorded in other user data. For example, in a restaurant, some main actor might choose to order one particular kind of food or another based on the user's preferences. So these are all types of data that might be incorporated into a smart card, or in general, supplied to the system as other user image data.

Some applications or places where the system might be used include, but are not limited to movies; video games; commercials; TV shows; kiosks; interactive information centers; safety trainers; training systems designed to show people skills; music instruction or other physical tutoring like sports or gymnastics; an information center such as directions within a building or a theme park; showing the user represented within a house or realty-type application; showing a walk-through of the user or client in an example of a building proposal; music videos; mystery games; fitness videos where the user's image could be incorporated; comic strips or books; CD-ROM games or games conveyed via the Internet or the web.

Within a movie, the system should permit having an individual appear on screen along side famous actors. Users can either appear as a supporting character or a main character. In the case of actually watching a movie in a movie theater with a plurality of other audience members, it might be more believable to have selected audience members who wish to participate in this manner simply appear in the background somewhere as virtual extras, but the system doesn't have to be limited to that application or mode of operation. In a home environment, it might be preferable to actually become the main character or have certain attributes of oneself imposed upon the main character.

In a video game, it would be desirable to allow the user to see his or her own image on the screen, kicking or driving, or doing whatever the video game character does.

For commercials, an embodiment in a set-top box used such that a user's own image or attribute is incorporated into the commercial would make the advertising much more compelling than a commercial that didn't have their image in it.

TV shows are similar to movies, in that there might be supporting characters, or unique to TV, recurring characters on the show, that might have a user's image corresponding to an individual user.

In any kind of interactive information center, such as giving directions or trainers of any kind, the invention allows a user to see himself or herself participating in whatever activity it is. For example, an information center which tells you that in order to get to the bus you have to walk three blocks this way and then two blocks that way, could actually show the user an image of themselves in the environment that they will be walking through.

Similarly, a skill trainer could be implemented using this invention showing somebody how to participate in some sort of sports or gymnastics. For example, a user's image may be superimposed on someone performing a tennis serve, showing the user how to properly move different portions of their body in order to complete the serve. Another trainer might demonstrate the user drawing an arrow for archery, or perhaps other kinds of sports skills training.

Almost any task that requires physical activity is something that could be simulated on the computer with the user's image. The present invention has particular merit for safety training, because you can show the user in fact doing something the wrong way and simulate an injury, and then show them the right way; the visual experience can be a much more compelling argument than simply saying "don't put your finger in the rotating fan".

Personal music videos are another application area. There are many kiosks sold right now to allow users to record their own lyrics or record their own voices as lead or backup singers to popular music songs. This invention permits the user to include themselves into a video incorporating their image and particularly, being able to visually see themselves performing some of the dances and moves that are present in the video and see their likeness doing it without actually having to possess the physical acuity to be able to make those moves or dance steps. A user's image can also be substituted into a music video during Karaoke.

Doctors might find use in producing fitness videos or other kind of training information, where the user's image is actually inserted to show them carrying out the exercise properly. It might also tend to make exercise videos more interesting for the user to be able to see their own facial image on the screen, on top of a well-proportioned and toned body. Patients recovering from injuries might use a video of recuperation exercises more readily if their own image appeared in it.

Some of the more seemingly esoteric bits of information that might be recorded as part of the additional user data, things like height and weight, could be used by the system to make a selection of which of a plurality of potential extras in a movie might be replaced by the user. If the user is of particularly tall stature or short stature, it would look rather odd if they were inserted respectively in place of a short or tall extra character. Information about their musical preferences might tailor the audio presentation of a movie or television show or some sort of instruction to select one of the available audio choices. If you have the user's city of birth, you might decide in a movie or other entertainment to have one of the main characters reference a particular city. There could simply be a library of different cities that the character might say, and if it happens to be one that the user is familiar or associated with, the system might pick that particular city when doesn't compromise the plot at hand.

Additional user information can be stored on a smart card that the user can carry with them and use in different locations. For example, the same smart card might be usable in a commercial movie theater, or at home using a set-top box, or an information kiosk. In this case, the smart card becomes a personal agent, a personality or personal projection, some sort of personal preferences portfolio. The card effectively becomes the user's clone, or cyber-clone, their cyber-personality.

The process of actually capturing all this user data and putting it on the smart card can be done in one place or can be done in multiple places, in one session or in multiple sessions. Some of the data entry may be done using a conventional PC, an interactive process with a set-top box, or similar functionality integrated into a television or some other entertainment system at home. It's also possible that there may be special purpose kiosks specifically set up to sell, dispense, and update smart cards of this manner. A logical place to put them would be any place that you have any kind of a shopping center or mall, or a movie theater-kind of complex. The process of collecting individual pictures of somebody's face or body is fairly straightforward—they would have to be in a controlled environment as far as lighting or other background distractions. A digital camera would be used to take a number of pictures, either simultaneously and with a plurality of cameras, or over a series of time by actually moving one or more cameras, or by having the person move with respect to one or more fixed cameras.

Instead of storing the user data on smart cards, it could be stored on servers. The servers need not be local to the user. User data could be stored and retrieved via the Internet. The image data could be stored in a clearing house or service bureau expressly serving this invention. In the case of movie distribution, users that pay to have their images stored on central servers might preferentially appear more often as extras in movies or other mass media, than folks that actually walked into the place with a smart card. Alternatively, users with user data on central servers could be picked at random to star as a particular extra if nobody with a smart card actually put one into the system, thereby keeping the movie experience fresh for repeat viewers and creating a new market for people who are watching to see if somebody they know happens to show up in an extra position.

If the user's name or any other personal information about the user (e.g., their high school) is available, and if there is visible a building in the background of a particular scene, labeled by default "Bob's Industry", it might changed to say "Jane's Industry" when Jane is watching the movie; alternatively, an on-screen visual of a high school pennant may be replaced by a pennant from Jane's high school.

Similarly, a user's birth date within the user data might end up being used within the context of a movie to reference some past event that was significant to the plot. For example, according to the "Back To The Future" trilogy, the date that time travel was invented was Nov. 1, 1955, but for purposes of the plot, virtually any date in 1955 would have worked as well. The system could replace the visuals of the date in the movie to coincide with a date more significant to the user.

If sufficient voice samples, phonemes or allophones are available, the user could have a speaking part in a movie or other presentation. In the case of information or training booth, user speech would be straight forward. Within the context of a mass-market movie at a public performance, this embodiment might require cooperation of the Screen Actors Guild.

Additionally, the information that's stored on a smart card or on a server, either at a user's home or elsewhere, may have tags associated with it. Some data may be tagged as private, or not for export. Data that could be used, for example, while the user is at home, comprising of more personalized images or private information like their birth date and birth city, might be suppressed and not available to the system for use on the basis of privacy in a public performance in a movie theater otherwise configured to use the information.

Additional user data may comprise a complete 3-D map of a user's own geometry, including the configuration of their limbs and sizes and proportions, allowing the user to be synthetically inserted into different scenes as an extra without having to do anything special to the movie if there is no user data to supply.

Another general thought about lighting. In the process of actually capturing the texture maps of a user's head or face, or the individual pictures that are stored, there might be a plurality of sets of these maps or pictures generated for different lighting conditions that would allow better results if somebody has to be lit from one side or another, or from below or above, in order to be believable inserted into a scene. Simultaneous monochromatic light sources from different angles might allow these multiple maps to be captured simultaneously, and with such perfect registration in the maps, the system could blend a plurality of intensity images together to construct lighting models not originally captured.

For very simple implementations, it might be easiest to restrict the allowable geometry used to insert a given person into a film. For example, if you know for sure that you're going to take a user's image and insert them somewhere as an extra (e.g., where somebody just happens to be standing in the background), if that person is only ever seen head on, then the only thing that the system needs is a head on image of the user's face that is scaled by the system appropriately and composited into place in the film. That saves a significant amount of computation, because the image processing degenerates to a simple scaling operation, and that's something that could be done very easily and at low cost as a way to bootstrap the process of actually implementing the system.

If the data sets for a given actor including the shape of their body and parts of their voice, and how they react to things, and how their expressions all work become sufficiently recorded, and the system becomes sufficiently advanced, you may actually have digital clones of actors being able to perform in new audiovisual productions.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for processing a video input signal having an associated original video image, the system comprising:
   a processing subsystem;
   addressable storage comprised of wire-frame memory providing storage of user image content utilized in generating a display of the original video image, a processor instruction memory, and a secondary image memory providing storage of program content utilized in generating a display of a predefined presentation;
   wherein the processing subsystem is responsive to the processor instruction memory for generating orientation signals responsive to the predefined presentation;
   wherein the processing subsystem is responsive to the processor instruction memory for generating a wire-frame geometry signal responsive to the orientation signals and to the wire-frame memory;
   an encoder, responsive to the program content, for generating encoder signals;
   wherein the processing subsystem is responsive to the processor instruction memory for selecting respective ones of the encoder signals as a masked area of selected encoder signals;
   a wire-frame compositing apparatus responsive to the selected encoder signals and the wire-frame memory and the orientation signals to generate a composited wire-frame signal; and
   a blender responsive to the video input signal and the composited wire-frame signal for generating a final composited video signal comprising the original video image with proper orientation mapped as a part of the display of the predefined presentation.

2. The system as in claim 1, wherein the wire-frame memory provides for output of the wire-frame signal by look-up in a stored data table of wire-frame data signals indexed by orientation.

3. The system as in claim 1, wherein the wire-frame signal is generated responsive to stored orientation data.

4. The system as in claim 1, wherein the encoder is a motion vector encoder and the encoder signals are motion vector signals.

5. The system as in claim 1, wherein the encoder is an MPEG encoder.

6. The system as in claim 1, further comprising: a processor for generating motion vectors responsive to the processor instruction memory, and the buffered original video input signal.

7. The system as in claim 1, wherein the system is responsive to expression cues within the video input signal for selecting a portion of the original video image for tracking and substitution.

8. The system as in claim 1, wherein the original video image is further comprised of a target image for detection by the system for use in tracking.

9. A method for processing a user-selected signal having an associated display of a video image, the method comprising:
   storing user image content in an addressable storage comprising wire-frame memory, wherein the user image content is utilized in generating a display of the video image;
   storing program content in a secondary image memory, wherein the program content is utilized in generating a predefined presentation associated with one of a movie, a video game, a computer-generated display, and an audiovisual presentation;
   tracking an image portion within the predefined presentation responsive to the processor instruction memory;
   generating orientation signals responsive to the tracking;

generating a wire-frame geometry signal responsive to the processing of the user image content responsive to the processor instruction memory and to the orientation signals;

generating encoder signals responsive to the tracking;

selecting respective ones of the encoder signals as a masked area of selected encoder signals;

generating a composited wire-frame signal responsive to the selected encoder signals and the wire-frame geometry signal;

generating a composited wire-frame map signal responsive to the composited wire-frame signal; and generating, responsive to the program content and the composited wire-frame map signal, a final composited video signal comprising the video image with proper orientation mapped as a part of the predefined presentation.

10. The method as in claim 9, further comprising: outputting from the wire-frame memory of the wire-frame signal by look-up in a stored data table of wire-frame data signals indexed by orientation.

11. The method as in claim 9, further comprising: generating the wire-frame data signal responsive to stored orientation data.

12. The method as in claim 9, further comprising: generating encoder signals comprising motion vectors utilizing an MPEG encoder.

13. The method as in claim 9, wherein the encoder signals are motion vector signals.

14. The method as in claim 13, further comprising: generating the motion vector signals responsive to the processor instruction memory, and the buffered original video input signal.

15. The method as in claim 9, further comprising:

selecting a portion of the predefined presentation for tracking and substitution responsive to expression cues within the predefined presentation.

* * * * *